(12) United States Patent
Swift

(10) Patent No.: US 12,434,262 B2
(45) Date of Patent: Oct. 7, 2025

(54) REMOVABLE RUBBER COMPOSITIONS, KITS, AND METHODS OF FORMING REMOVABLE WATERPROOF BARRIERS

(71) Applicant: Swift IP, LLC, Weston, FL (US)

(72) Inventor: Philip Swift, Weston, FL (US)

(73) Assignee: Swift IP, LLC, Weston, FL (US)

( * ) Notice: Subject to any disclaimer, the term of this patent is extended or adjusted under 35 U.S.C. 154(b) by 119 days.

(21) Appl. No.: 18/067,699

(22) Filed: Dec. 16, 2022

(65) Prior Publication Data

US 2023/0191444 A1 Jun. 22, 2023

Related U.S. Application Data

(63) Continuation-in-part of application No. 17/554,610, filed on Dec. 17, 2021.

(51) Int. Cl.
*B05C 21/00* (2006.01)
*B05C 17/005* (2006.01)
*C09D 5/02* (2006.01)
*C09D 121/00* (2006.01)

(52) U.S. Cl.
CPC .......... *B05C 21/00* (2013.01); *B05C 17/0052* (2013.01); *B05C 17/00596* (2013.01); *C09D 5/021* (2013.01); *C09D 121/00* (2013.01)

(58) Field of Classification Search
CPC ........................... E04H 9/145; E06B 2009/007
See application file for complete search history.

(56) References Cited

U.S. PATENT DOCUMENTS

| 4,382,530 A * | 5/1983 | Calisto ................ B65D 25/48 222/326 |
| 5,301,843 A * | 4/1994 | Groene ............ B05C 17/00516 222/562 |
| 7,735,291 B2 | 6/2010 | Summy |

(Continued)

FOREIGN PATENT DOCUMENTS

WO 2019217902 A1 11/2019

OTHER PUBLICATIONS

"Flex Seal Spray";www.flexsealproducts.com/product/flex-seal/; captured Oct. 5, 2020 (Year: 2020).*
"Flex Seal Spring Thaw Kit"; www.flexsealproducts.com/product/spring-thaw-kit/; captured Sep. 27, 2020 (Year: 2020).*

(Continued)

*Primary Examiner* — David P Angwin
*Assistant Examiner* — Bradley S Oliver
(74) *Attorney, Agent, or Firm* — Banner & Witcoff, Ltd.

(57) ABSTRACT

A kit for use in storm-proofing a structure may include a cartridge comprising an injectable rubber caulk or a malleable rubber paste, a container comprising a viscous liquid rubber composition, a roll comprising a rubberized adhesive tape, a can comprising a sprayable aerosol-based rubberized liquid, a caulking gun configured to engage and dispense contents of the cartridge, a paintbrush, a gap filler tool, a pair of gloves, a pair of safety goggles, and printed instructions. Each component may be combined into a unitary packaging assembly. The injectable rubber caulk, the malleable rubber paste, the viscous liquid rubber composition, the rubberized adhesive tape, and the sprayable aerosol-based rubberized liquid may be safely removed after application and use, or after a storm or natural event has subsided.

22 Claims, 24 Drawing Sheets

(56) References Cited

U.S. PATENT DOCUMENTS

| | | |
|---|---|---|
| 9,528,005 B1 | 12/2016 | Miriani et al. |
| 9,586,751 B1 | 3/2017 | Swift |
| 10,259,008 B1 | 4/2019 | Swift et al. |
| 10,294,715 B1 | 5/2019 | Hertel |
| 10,960,830 B2 | 3/2021 | Swift |
| 11,060,313 B2 | 7/2021 | Weiss et al. |
| 11,131,620 B1 | 9/2021 | Swift |
| 11,840,878 B2 | 12/2023 | Liebscher et al. |
| 2005/0011140 A1 | 1/2005 | Ackerman et al. |
| 2005/0102964 A1 | 5/2005 | Grunst |
| 2006/0051558 A1 | 3/2006 | Sieber et al. |
| 2010/0170186 A1 | 7/2010 | Hohmann, Jr. |
| 2015/0323103 A1 | 11/2015 | Coscarella |
| 2017/0182512 A1 | 6/2017 | Swift |
| 2018/0282997 A1 | 10/2018 | Chen et al. |
| 2019/0017315 A1 | 1/2019 | Barresi |
| 2019/0217332 A1 | 7/2019 | Swift |
| 2019/0277024 A1 | 9/2019 | Preston |
| 2020/0095742 A1 | 3/2020 | Sheridan et al. |
| 2020/0164599 A1 | 5/2020 | Swift |
| 2021/0079667 A1 | 3/2021 | Baiada et al. |
| 2021/0178429 A1 | 6/2021 | Swift |
| 2021/0189675 A1 | 6/2021 | Mitchell |
| 2021/0213893 A1 | 7/2021 | Swift |
| 2021/0310268 A1 | 10/2021 | Weiss et al. |
| 2021/0396651 A1 | 12/2021 | Swift |
| 2022/0325549 A1 | 10/2022 | Farmer |
| 2023/0167655 A1 | 6/2023 | Swift |
| 2023/0175280 A1 | 6/2023 | Riemelmoser |
| 2023/0191444 A1 | 6/2023 | Swift |
| 2023/0220643 A1 | 7/2023 | Beers et al. |
| 2024/0301713 A1 | 9/2024 | Ramsey et al. |
| 2024/0309669 A1 | 9/2024 | Fries |

OTHER PUBLICATIONS

Stop Leaks Fast With Flex Seal Liquid Rubber in an Aerosol Can!, Chemical Science, www.myflexseal.com, 2011.

Flood Zipper™ Keeps Homes Bone-Dry, GHW Solutions, LLC, 2022.

Tapeplanet, Silver Duct Tape, https://www.tapeplanet.com/silver-duct-tape-12-304-8mm-x-60-yard-roll, visited on Apr. 9, 2023.

WOD Contractor Grade Duct Tape 60 yards DTC12 https://taperproviders.com/products/dtc12-pa?variant=43204268130539, visited Apr. 9, 2023.

Jun. 7, 2023—(WO) ISR and WO—App PCT/US2022/081893.

"Waterproofing Kits" 1-3. ARC inc.. Web: <https://arcfirst.net/wp-content/uploads/2021/07/WP1000-PRE-Waterproofing-Kits-Specification-Submittal-Form.pdf>. Apr. 19, 2019; Entire Document.

"How to Remove Weather Stripping Adhesive" 1-4. Metro Moulded Parts Inc. Web: <https://metrommp.com/how-to-remove-weather-stripping-adhesive/>. Mar. 10, 2021; p. 2.

Still shots from the video "How to Prepare for Storms with Flex Seal Family of Products"; YouTube Video; https://www.youtube.com/watch?v=G1LZwsVtKtc; Jun. 15, 2020 (Year: 2020).

"How to Remove Flex Seal Spray from Surfaces"; https://flexsealproducts.com/blogs/how-to/how-to-remove-flex-seal-spray?srsltid=AfmBOoqzih7NBgiY51AohZtRFVLKqiR5Csfxga9IDimdu5wLN63ejxkl (Year: 2024).

"How to Remove Flex Shot"; https://flexsealproducts.com/blogs/product-resources/how-to-remove-flex-shot#:-:text=You%20can%20remove%20uncured%20Flex,blade%20or%20caulk%20removal%20tool. (Year: 2024).

"How to Remove Flex Tape"; https://flexsealproducts.com/blogs/how-to/how-to-remove-flex-tape?srsltid=AfmBOoqKBelECa8cxyx6xlg7ItFX8DGjnj3XSpzUUbjsULxSSvr042gN (Year: 2024).

\* cited by examiner

REMOVABLE RUBBER COMPOSITIONS, KITS, AND METHODS OF FORMING REMOVABLE WATERPROOF BARRIERS

CROSS REFERENCE TO RELATED APPLICATIONS

This application is a is a continuation-in-part of U.S. application Ser. No. 17/554,610 filed on Dec. 17, 2021, hereby incorporated by reference in its entirety.

BACKGROUND

The increased prevalence and severity of tropical storms in the Southeastern United States and various other locations has spawned a need for improved products for protecting dwellings, commercial buildings, vehicles, and other structures from water damage. Aerosol-propelled, liquid, and paste rubber compositions, such as FLEX SEAL®, FLEX TAPE®, and FLEX PASTER sold by Swift Response LLC, have been used by consumers for waterproofing and repairing household articles. It would be desirable to develop an easy-to-use product that enables property owners or custodians to create a temporary, waterproof or water-resistant barrier that functions to protect structures during the pendency of a storm and which can be easily removed once the storm or flood waters have subsided.

SUMMARY

Aspects of the invention involve applying sprayable, aerosol-based rubber compositions, to articles and solidifying the composition to create a flexible waterproof barrier. The composition may be applied to create a temporary, removable waterproof barrier for a wide variety of building structures and related components such as doors, windows, as well as mobile homes, recreational vehicles, campers, tents, vinyl awnings, covers and tarps, and the like.

Another aspect of the invention involves applying viscous liquid rubber compositions to articles by brushing, rolling, pouring, or dipping, to create a flexible, yet removable, waterproof barrier. The viscous liquid rubber composition may be solidified to create a temporary, removable waterproof barrier for a wide variety of building structure and related components such as doors, windows, garages, as well as mobile homes, recreational vehicles, campers, tents, vinyl awnings, covers and tarps, and the like.

Still other aspects of the invention involve techniques in which a malleable, rubberized paste or caulk is applied and conforms to the shape of an article to create a flexible, waterproof barrier. The paste and caulk may be applied to create a temporary, removable waterproof barrier for a wide variety of structures such as doors, windows, mobile homes, recreational vehicles, campers, tents, vinyl awnings, covers and tarps, and the like.

Still other aspects of the invention involve techniques in which a relatively thick, rubberized adhesive tape is applied and conforms to the shape of an article to create a flexible, waterproof barrier. The tape may be applied to create a temporary, removable waterproof barrier for a wide variety of structures such as doors, windows, mobile homes, recreational vehicles, campers, tents, vinyl awnings, covers and tarps, and the like. In some examples, strips of tape may be applied in which the strips of tape overlap. In other examples, the strips of tape do not overlap and a gap may be formed between the strips of tape. In certain examples, creating the waterproof barrier may include filling the gaps formed between the strips of the rubberized adhesive tape with one or more of the viscous liquid rubber composition, the injectable rubber caulk, or the malleable rubber paste, and removing one or more of the viscous liquid rubber composition, the injectable rubber caulk, or the malleable rubber paste after the storm or water has subsided.

Another aspect of the invention involves techniques of storm-proofing or waterproofing a building structure that includes preparing a container or a water holding enclosure surrounding the building structure, placing or building a building structure with a garage within the container or water holding enclosure surrounding the building structure, applying removable rubber compositions such as a sprayable aerosol-based rubberized liquid, a viscous liquid rubber, a thick malleable rubber paste, an injectable rubberized caulk, a rubberized adhesive tape, or combinations thereof onto and into the structure, or a portion thereof, and solidifying the compositions to create a temporary, watertight seal, filling the container or water holding enclosure surrounding the building structure with water, wherein the water partially covers the structure, verifying that an interior of the structure is watertight, draining the water from the container or water holding enclosure surrounding the building structure, removing the solidified rubber compositions from the building structure, and re-verifying that the interior of the structure is watertight.

Another aspect of the invention involves techniques of storm-proofing or waterproofing a building structure in which a removable rubber composition is applied to the building structure or a portion thereof and solidifying the composition to create a temporary, watertight seal. In some examples, the building structure may be positioned within a water holding enclosure. In some examples the building structure will include a garage with a garage door. In yet another example, the building structure will include at least one door. In other examples, the building structure may be selected from the group consisting of a house, a miniature house, a mobile home, a trailer, and an automobile. In some examples, the building structure may not have a roof. In some examples, the building structure may be partially covered with water. In still other examples, the water may be removed or drained from the water holding enclosure to the point in which the building structure is no longer covered in water. The solidified rubber composition may then be removed from the building structure without damaging the building structure or related components, and the building structure may be verified as being watertight or to verify that water infiltration has been limited or minimized. In still other examples, the removable rubber composition may be a sprayable aerosol-based rubberized liquid, a viscous liquid rubber, a thick malleable rubber paste, an injectable rubber caulk, a rubberized adhesive tape, or combinations thereof.

Yet another aspect of the invention involves a method of storm-proofing a house or other building structure by applying a removable rubber composition onto the house or a portion thereof to create a temporary, watertight seal. In some examples, the removable rubber composition may be selected a sprayable aerosol-based rubberized liquid, a viscous liquid rubber, a malleable rubber paste, an injectable rubber caulk, a rubberized adhesive tape, and combinations thereof. In another example, the removable rubber composition is applied from a ground level of the house to a height of at least 3 feet above the ground level. In yet another example, the house may include at least one door, a garage door, and a plurality of windows. In another example, the house may lack a roof. In some examples, every seam of the at least one door, the garage door, and the plurality of windows may be sealed with the rubber composition(s). In still other examples, the house may be positioned within a water holding enclosure surrounding the house, and the strips of the rubberized adhesive tape may be applied end to end such that small gaps are formed between the strips of the rubberized adhesive tape. The gaps may be formed end to end in width of the tape and may also form end to end in length of the tape. In one example, the strips of the rubberized tape may be applied such that the ends overlap with each other. The ends may overlap in width-wise and/or length-wise. The gaps formed between the strips of the rubberized adhesive tape may be filled or covered with one or more of the viscous liquid rubber composition, the injectable rubber caulk, or the malleable rubber paste. In some examples, the method may include flooding the water holding enclosure with water to cover a portion of the house with the water, subsequently draining the water from the water holding enclosure, and removing the rubber composition from the house without damaging the house.

Other aspects of the invention involve techniques of waterproofing a building structure by applying a removable rubber composition onto the building structure or a portion thereof to create a temporary water barrier prior to exposure to storm or flood water. In some examples, the removable rubber composition may be a sprayable aerosol-based rubberized liquid, a viscous liquid rubber, a malleable rubber paste, an injectable rubber caulk, a rubberized adhesive tape, or combinations thereof. In other examples, the removable rubber composition may be applied from a ground level of the building structure to a height of at least 3 feet above the ground level. In another example, the building structure may include at least one door and every seam of the at least one door may be sealed with the rubber composition. In some examples, the strips of the rubberized adhesive tape may be applied end to end such that small gaps are formed between the strips of the rubberized adhesive tape. In yet another example, the gaps formed between the strips may be filled with the rubberized adhesive tape with one or more of the viscous liquid rubber composition, the injectable rubber caulk, or the malleable rubber paste. In still other examples, the rubber composition may be removed from the house without damaging the house after the storm or flood water has subsided.

Other embodiments of the invention provide a kit for storm proofing a structure. In one aspect disclosed herein, the kit may include a cartridge comprising an injectable rubber caulk or a malleable rubber paste, a container comprising a viscous liquid rubber composition. In some examples, the injectable rubber caulk, the malleable rubber paste, and the viscous liquid rubber composition may be removed without damaging the underlying structure. In some examples, the kit may include caulking gun configured to dispense contents of the cartridge, a pair of gloves, a paintbrush or a roller, a gap filler tool, and printed instructions. In some examples, the kits disclosed herein may also include a utility knife or other cutting tool. In one example, each component may be combined into a unitary packaging assembly.

In certain examples, the printed instructions may instruct the filling of gaps or cracks in the structure with the injectable rubber caulk or with the malleable rubber paste using the caulking gun or other tool, such as the gap filler tool or a spatula. In other examples, the printed instructions may further instruct the coating of the rubber caulk filled gaps/cracks or coating the rubber paste filled gaps/cracks with the viscous liquid rubber composition using the paintbrush or the roller. In yet other examples, the printed instructions may instruct covering a portion of the structure with the viscous liquid rubber composition using the paintbrush or the roller. In another example, the kit may further include a roll of rubberized adhesive tape, a can containing a sprayable aerosol-based rubberized liquid, a pair of safety goggles, and additional printed instructions. In some examples, the rubberized adhesive tape and the sprayable aerosol-based rubberized liquid may be removed without damaging the underlying structure. In another example, the instructions or the additional instructions may instruct filling or covering a portion or part of the structure with the injectable rubber caulk or the malleable rubber paste using the caulking gun or other tool, such as the gap filler tool. In other examples, the instructions or the additional instructions may instruct coating the rubber caulk filled or covered portion or part of the structure or coating the rubber paste filled or covered portion or part of the structure with the viscous liquid rubber composition using the paintbrush or the roller. In one example, the printed instructions or the additional printed instructions may instruct covering a portion of the structure with the viscous liquid rubber composition using the paintbrush or the roller, application of the rubberized adhesive tape on at least a portion of the structure, spraying the aerosol-based rubberized liquid on at least a portion the structure, or combinations thereof.

In another aspect of the invention disclosed herein, a kit for use in storm-proofing a structure may include a cartridge containing an injectable rubber caulk or a malleable rubber paste, a container comprising a viscous liquid rubber composition, a roll of rubberized adhesive tape, a can containing a sprayable aerosol-based rubberized liquid, a caulking gun configured to engage and dispense contents of the cartridge, a paintbrush or a roller, a gap filler tool, a pair of gloves, a pair of safety goggles, and printed instructions. In other examples, each component may be combined into a unitary packaging assembly, and the injectable rubber caulk, the malleable rubber paste, the viscous liquid rubber composition, the rubberized adhesive tape, and the sprayable aerosol-based rubberized liquid may be removed after application and use without damaging the structure.

In some examples, the printed instructions may include directions to fill a portion of the structure with the injectable rubber caulk or the malleable rubber paste using the caulking gun or other tool, and subsequently instruct coating the rubber caulk filled portion of the structure or the malleable rubber paste filled portion of the structure with the viscous liquid rubber composition using the paintbrush or the roller. In yet another example, the printed instructions may include directions to cover a portion of the structure with the injectable rubber caulk or the malleable rubber paste using the caulking gun, gap filler tool, or other tool, covering the portion of the structure with the viscous liquid rubber composition using the paintbrush or roller, covering the portion of the structure with the rubberized adhesive tape, spraying the portion of the structure with the aerosol-based rubberized liquid, or combinations thereof. In one example, the printed instructions may further provide directions to remove the injectable rubber caulk, the malleable rubber paste, the viscous liquid rubber composition, the rubberized adhesive tape, and the aerosol-based rubberized liquid after a storm or natural event has passed.

In yet another aspect disclosed herein, a waterproofing kit may include a cartridge comprising an injectable rubber caulk or a malleable rubber paste, a container comprising a viscous liquid rubber composition, a caulking gun configured to dispense contents of the cartridge, a pair of gloves, a paintbrush or a roller, a gap filler tool, and printed instructions, each contained within a unitary packaging assembly. In one example, the printed instructions may instruct applying the injectable rubber caulk or the malleable rubber paste with the caulking gun or other tool and/or the gap filler tool to fill gaps/cracks of an object, and the printed instructions may also instruct applying the viscous liquid rubber composition with the paintbrush or the roller to cover the rubber caulk filled gaps/cracks or the rubber paste filled gaps/cracks.

In some examples, the waterproofing kit may also include a roll of rubberized adhesive tape, a can of sprayable aerosol-based rubberized liquid, a pair of safety goggles, and additional printed instructions that may instruct covering at least part of an object with the injectable rubber caulk or the malleable rubber paste using the caulking gun, a gap filler tool, or other tool, covering at least part of the object with the viscous liquid rubber composition using the paintbrush or roller, covering at least part of the object with the rubberized adhesive tape, spraying at least part of the portion of the object with the aerosol-based rubberized liquid, or combinations thereof. In some examples, the additional printed instructions may include instructing removal of the injectable rubber caulk, the malleable rubber paste, the viscous liquid rubber composition, the rubberized adhesive tape, and the aerosol-based rubberized liquid after a storm or natural event. In yet another example, the injectable rubber caulk, the malleable rubber paste, the viscous liquid rubber composition, the rubberized adhesive tape, and the sprayable aerosol-based rubberized liquid may be removed after application and use without damaging the object.

In still another aspect disclosed herein, a method of packaging a storm-proofing kit may include the steps of providing a tray, box, or other container having a plurality of compartments for receiving a cartridge comprising an injectable rubber caulk or a malleable rubber paste, a container comprising a viscous liquid rubber composition, a caulking gun configured to engage and dispense contents of the cartridge, a paintbrush or a roller, a gap filler tool, and a pair of gloves. In some examples, an additional step may include providing a roll of rubberized adhesive tape, a can comprising a sprayable aerosol-based rubberized liquid, and a pair of safety goggles. The steps may further include placing the cartridge, the container, the roll, the can, the caulking gun, the paintbrush or the roller, the pair of gloves, the pair of safety goggles within the tray, box, or other container, inserting instructions for using the storm-proofing kit within the tray, box, or other container, enclosing the tray, box, or other container in the at least one layer of wrap material by shrink-wrapping the at least one layer of wrap material about the tray, box, or other container, and disposing an outer packaging about both the tray, box, or other container and the at least one layer of wrap material. The steps may also further include affixing one of an instruction tag, printed instructions, or combinations thereof to the outer packaging, the one of an instruction tag, printed instructions, or combinations thereof comprising indicia regarding use of the storm-proofing kit.

In one aspect disclosed herein, a storm-proofing kit packaging assembly may include a tray, box, or container having multiple compartments, a cartridge comprising an injectable rubber caulk or a malleable rubber paste, a container of viscous liquid rubber composition, a roll comprising a rubberized adhesive tape, a can of sprayable aerosol-based rubberized liquid, a caulking gun configured to engage and dispense contents of the cartridge, a paintbrush or a roller, a gap filler tool, a pair of gloves, or a pair of safety goggles disposed within the plurality of compartments. The assembly may also include instructions regarding use of the storm-proofing kit, and an outer packaging about the tray, box, or container.

In one aspect disclosed herein, a kit for use in storm-proofing or waterproofing a structure may include a cartridge comprising one of a) an injectable rubber caulk and b) a malleable rubber paste, a container comprising a viscous liquid rubber composition, wherein the injectable rubber caulk, the malleable rubber paste, and the viscous liquid rubber composition are removable without damaging the structure, a caulking gun configured to dispense contents of the cartridge, a pair of gloves, a paintbrush or roller, a gap filler tool, and printed instructions, wherein each component is combined into a unitary packaging assembly.

In some examples, the printed instructions may instruct a user to fill gaps in the structure with the injectable rubber caulk or the malleable rubber paste using the caulking gun or the gap filler tool. In another example, the instructions may then instruct a user to coat the rubber caulk filled gaps or coating the rubber paste filled gaps with the viscous liquid rubber composition using the paintbrush. In some examples, instructions may then instruct a user to cover a portion of the structure with the viscous liquid rubber composition using the paintbrush.

In another aspect disclosed herein, the kit may further include a roll comprising a rubberized adhesive tape, a can comprising a sprayable aerosol-based rubberized liquid, wherein the rubberized adhesive tape and the sprayable aerosol-based rubberized liquid are removable without damaging the structure, a pair of safety goggles, and additional printed instructions. In other examples, the additional printed instructions may instruct a user to fill or cover a portion of the structure with the injectable rubber caulk or the malleable rubber paste using the caulking gun or the gap filler tool. In some examples, the additional printed instructions may further instruct the user to coat the rubber caulk filled or covered portion of the structure or to coat the rubber paste filled or covered portion of the structure with the viscous liquid rubber composition using the paintbrush or roller. In other examples, the additional instructions may then instruct the user to cover a portion of the structure with the viscous liquid rubber composition using the paintbrush or roller. In still another example, the additional instructions may instruct a user to place the rubberized adhesive tape on at least a portion of the structure, and then spray the aerosol-based rubberized liquid on at least a portion the structure.

In still another aspect disclosed herein, a kit for use in storm-proofing or waterproofing a structure may include a cartridge comprising one of a) an injectable rubber caulk and b) a malleable rubber paste, a container comprising a viscous liquid rubber composition, a roll comprising a rubberized adhesive tape, a can comprising a sprayable aerosol-based rubberized liquid, wherein the injectable rubber caulk, the malleable rubber paste, the viscous liquid rubber composition, the rubberized adhesive tape, and the sprayable aerosol-based rubberized liquid are removable without damaging the structure adhered to, a caulking gun configured to engage and dispense contents of the cartridge, a paintbrush, a gap filler tool, a pair of gloves, a pair of safety goggles, and printed instructions, wherein each component is combined into a unitary packaging assembly.

In other examples, the printed instructions may further instruct a user to fill a portion of the structure with the injectable rubber caulk or the malleable rubber paste using the caulking gun or the gap filler tool. In some examples, the printed instructions may further instruct to coat the rubber caulk filled portion of the structure or the malleable rubber paste filled portion of the structure with the viscous liquid rubber composition using the paintbrush. In another example, the printed instructions may further instruct covering a portion of the structure with the injectable rubber caulk or the malleable rubber paste using the caulking gun or the gap filler tool, or covering the portion of the structure with the viscous liquid rubber composition using the paintbrush, or covering the portion of the structure with the rubberized adhesive tape, or spraying the portion of the structure with the aerosol-based rubberized liquid. In yet another example, the printed instructions may further instruct removal of the injectable rubber caulk, the malleable rubber paste, the viscous liquid rubber composition, the rubberized adhesive tape, and the aerosol-based rubberized liquid after a storm.

In other aspects disclosed herein, a waterproofing kit may include a cartridge comprising one of a) an injectable rubber caulk and b) a malleable rubber paste, a container comprising a viscous liquid rubber composition, wherein the injectable rubber caulk, the malleable rubber paste, and the viscous liquid rubber composition are removable without damaging a structure or an object adhered to, a caulking gun configured to dispense contents of the cartridge, a pair of gloves, a gap filler tool, a paintbrush, and printed instructions, wherein each component may be combined into a unitary packaging assembly. In certain examples, the printed instructions may instruct applying the injectable rubber caulk or the malleable rubber paste with the caulking gun or the gap filler tool to fill gaps of an object, and the printed instructions may further instruct applying the viscous liquid rubber composition with the paintbrush to cover the rubber caulk filled gaps or the rubber paste filled gaps.

In still other examples, the kit may further include a roll comprising a rubberized adhesive tape, a can comprising a sprayable aerosol-based rubberized liquid, wherein the rubberized adhesive tape and the sprayable aerosol-based rubberized liquid are removable without damaging a structure or an object adhered to, a pair of safety goggles, and additional printed instructions. In some examples, the additional printed instructions may instruct covering at least part of an object with the injectable rubber caulk or the malleable rubber paste using the caulking gun or the gap filler tool, or covering at least part of the object with the viscous liquid rubber composition using the paintbrush, or covering at least part of the object with the rubberized adhesive tape, or spraying at least part of the portion of the object with the aerosol-based rubberized liquid. In another example, the additional printed instructions may further instruct removal of the injectable rubber caulk, the malleable rubber paste, the viscous liquid rubber composition, the rubberized adhesive tape, and the aerosol-based rubberized liquid after a storm.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Figure 1:
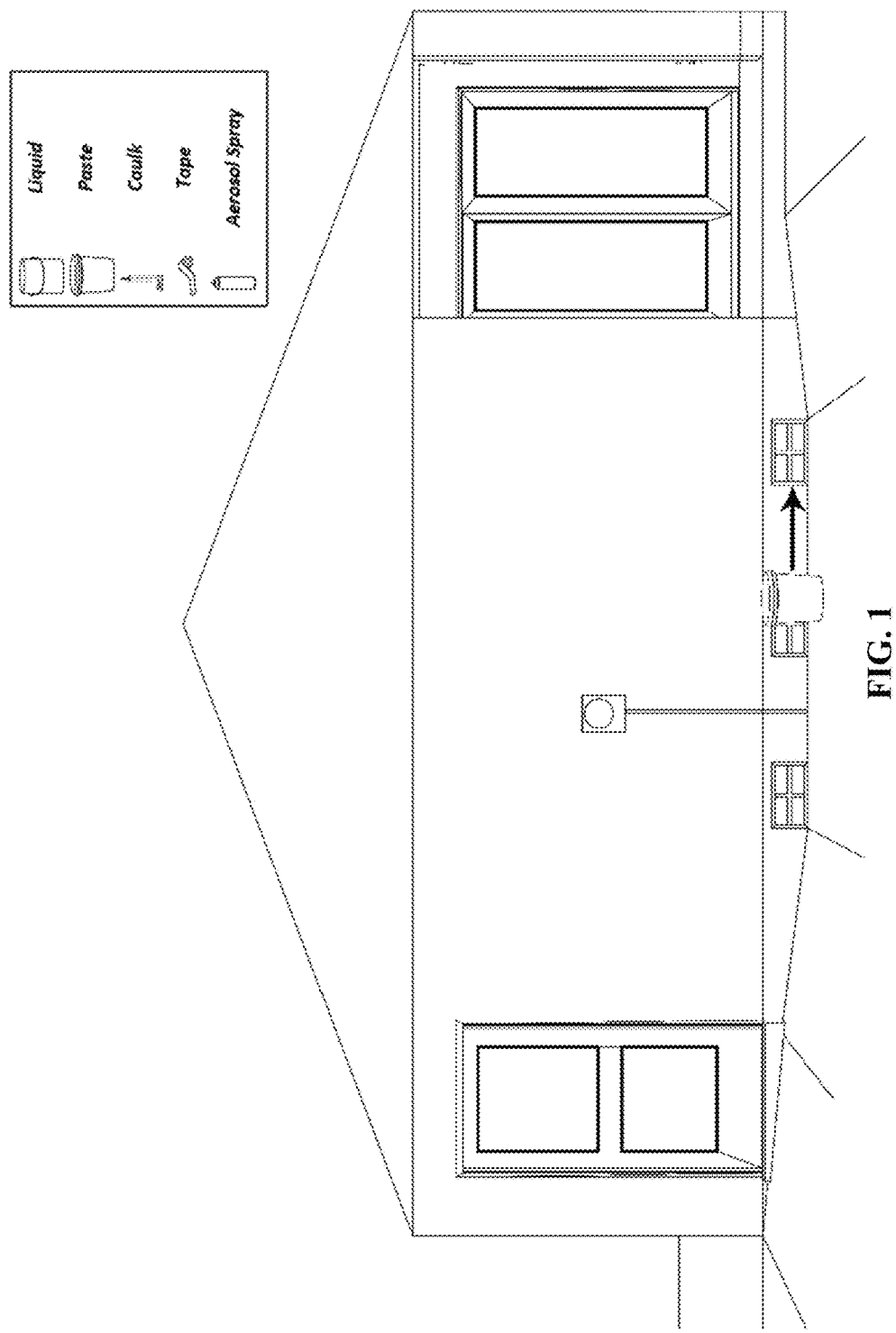
FIG. 1 illustrates application of a removable rubberized paste composition to waterproof a house.

Sprayable, aerosol-based liquid rubber compositions (sometimes referred to herein simply as "compositions") may be used to form a temporary, removable waterproof barrier for a wide variety of structures such as doors, windows, mobile homes, recreational vehicles, campers, tents, vinyl awnings, covers and tarps, and the like.

"Compositions" may also refer to viscous liquid rubber compositions, or malleable, rubberized pastes and caulks that may be may be used to form a temporary, removable waterproof barrier for a wide variety of structures such as doors, windows, mobile homes, recreational vehicles, campers, tents, vinyl awnings, covers and tarps, and the like. Composition may also be used interchangeably with "tape" herein. The compositions may be designed to help slow down, restrict, or stop flood and storm waters from entering homes, businesses, municipality or other types of building structures. A building structure may include a house, a house with a garage, a motor home, a trailer, a shed, an apartment, a condominium, a townhome, barndominium, an office building, a residential building, a retail building, multipurpose building, a school, a university building, a church, an airport, an airport terminal or other transportation terminal, a religious building, or other dwelling. The compositions disclosed herein may be water-resistant (i.e., capable of resisting the penetration of water to some degree but not entirely); water-repellent (i.e., not easily penetrated by water); and/or waterproof (i.e., impervious to water). The terms waterproof, water-resistant, and water-repellent may be used interchangeably herein. The compositions disclosed herein may also create a structure or component that is substantially water-tight, limiting the amount of water that penetrates a structure or component. For example, the water that penetrates a building structure or component thereof may be limited to at least, greater than, less than, equal to, or any number in between about 0, 1, 2, 3, 4, 5, 6, 7, 8, 9, 10, 11, 12, 13, 14, 15, 16, 17, 18, 19, 20, 21, 22, 23, 24, 25, 30, 35, 40, 45, and 50 gallons of water.

In some examples, compositions may also be applied to articles for purposes of waterproofing, or modifying an article to make it waterproof by covering preformed holes, or openings or by adding a moisture-impermeable layer to the article or portion thereof. The compositions may include one or more synthetic rubber components and generally may be formulated to be sprayable by inclusion of an aerosol propellant. The compositions may be sprayed, poured, or spread into cracks in concrete, such as cracks present along a garage floor or in a basement foundation. The compositions may be sprayed, poured, or spread directly into, on, or within seams, cracks, holes, or gaps in windows, doors, etc. to penetrate into deep hard-to-reach areas and create a waterproof seal. The compositions also may be applied with a paint roller onto doors, windows, garage doors, sliding doors, siding, concrete walls or floors to create a waterproof layer. Alternatively, do to the ease of removal, the rubberized compositions and rubberized tape may be applied to the interiors of building structures or related components as a means to weatherproof and waterproof the structures.

In other examples, a relatively thick, rubberized adhesive tape (sometimes referred to herein simply as "tape") may be used to create a temporary, removable waterproof barrier for building structures and/or various articles such as doors, windows, mobile homes, recreational vehicles, campers, tents, vinyl awnings, covers and tarps, and the like.

The tape may be highly flexible, allowing it to readily conform to the shape of the article to which it is applied. The adhesive layer is capable of forming a strong bond with a variety of surfaces under a variety of conditions. In some examples, the tape may be applied to a surface that is in contact with water, such as in the case where a storm or flooding has already begun. In other examples the tape may be applied to a dry surface. In some examples, the tape may not be applied to a wet surface. In still another example, the tape must be applied to a dry surface.

In some examples, a tape is applied to a building structure or an article for purposes of waterproofing, including providing a temporary, removable waterproof barrier, or modifying an article to make it waterproof by covering preformed holes or by adding a moisture-impermeable layer to the article or a portion thereof. The tape generally may provide a durable, breathable, weatherproof barrier that is resistant to rain, snow, sun, wind, air moisture, UV degradation, and natural weathering over a wide temperature range.

The compositions may also include one or more synthetic rubber components and generally may be formulated to be viscous though in the liquid phase at room temperature, or a thick malleable paste or caulk at room temperature. The term "viscous liquid composition" or "paste composition" or "caulk composition" may be used herein to refer to non-aerosol based rubber compositions that have a relatively high viscosity, and/or a high thickness and malleability. For example, when a quantity of the composition is poured into a kitchen strainer or onto a horizontally-oriented window screen, the composition normally remains adhered to the strainer or screen without any dripping. For example, see U.S. Pat. Nos. 10,960,830 and 9,528,005, both incorporated herein by reference in their entirety for all purposes. By way of non-limiting example, viscosity of the liquid composition, for example, may range from about 130 ku to about 170 ku, from about 140 ku to about 160 ku, or from about 150 ku to 155 ku; and specific gravity may range from about 1.2 to 1.4 or from about 1.25 to about 1.35. The compositions disclosed herein may be applied at temperatures from about 32° F. to about 150° F. In some examples, the compositions disclosed herein may be applied to wet structures or objects. In still other examples, the compositions disclosed herein may be applied to structures of objects under or submerged in water.

Non-limiting examples of suitable synthetic rubber components include ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. The compositions typically include a number of other components, such as mineral fillers, fluid carriers, crosslinking agents, catalysts, and the like in suitable proportions that will be apparent to persons skilled in the art with the aid of no more than routine experimentation. The compositions may contain a solvent that volatilizes after application, although in view of current environmental regulations it generally is desirable to employ solvent-less compositions which may cure, for example, by crosslinking when exposed to the environment.

In other examples, the compositions disclosed herein, to include the sprayable aerosol-based rubberized liquid, a viscous liquid rubber, a thick malleable rubber paste, an injectable rubberized caulk may be formulated to include one or more chemical components to enhance the removability of the components and at room temperature. In yet other examples, the compositions disclosed herein may be formulated to remove one or more chemical components to enhance the removability of the compositions at room temperature. Chemical components may include natural or synthetic polymers, resins, adhesives, oils, etc. A nonlimiting example may include modifying compositions, such as FLEX SEAL®, FLEX SEAL LIQUID®, and FLEX PASTER sold by Swift Response LLC, to enhance the removability of the compositions after application. In some examples, the formulation of the compositions may be modified to include a decreased amount of adhesive to improve removability characteristics. In some examples, the formulation of the compositions may be modified to include an increased amount of oil or resins to improve removability characteristics. In other examples, the formulation of the compositions may be modified to include a decreased amount of oil or resins to improve removability characteristics. In yet another example, the formulation of the compositions may be modified by changing the ratio of oil to resins to improve removability characteristics.

The composition may be provided in a ready-to-use state, e.g., such that no mixing of components is needed. In some aspects, the compositions may be sprayed directly from a spray applicator which contains the composition in a ready-to-use state, poured from a container or applied with a paint roller, or applied with an appropriate tool such as a caulking gun, trowel or similar device. The tape may be applied manually and cut or torn into strips appropriate for the application.

If desired, the compositions and tape may be formulated in a variety of colors tailored to particular applications. For example, compositions and tape may be clear, white, off-white, black, gray, blue, green, red, almond, brown, silver, yellow, terra cotta, or other suitable or desirable colors. In other examples, the tape adhesive may be clear. In yet other examples, the tape adhesive may be colored. The selection of appropriate pigment(s) or other colorant(s) needed to achieve a desired color will be apparent to persons skilled in the art.

The compositions disclosed herein may also be applied to exterior surfaces of automobiles, motor homes, or other types of motor vehicles such as boats, to form a protective layer. The composition also may be applied to various fabrics such as an umbrella, tent, awning, or the like to provide waterproofing. After flood waters or a storm has subsided, the compositions may be removed from the exterior surfaces.

FIG. 1 illustrates application of a removable rubberized paste composition to waterproof or stormproof an example house. The removable rubberized paste composition may be applied to the house foundation, doors, or windows near the ground level by use of a trowel or similar tool. The removable rubberized paste composition may be liberally applied to molding and window flanges anywhere ground water, flood waters, storm waters, or rain may be able to enter the structure. The removable rubberized paste composition may be used to seal cracks, joints, or the outline of the window, or may be used to cover the entire window unit itself. The removable rubberized paste may also be applied to sliding door seams, including along the sliding door base. After flooding or after water has receded or the storm ends, the removable rubberized paste composition may be removed from the structure. In some examples, the aerosolized rubberized liquid-spray composition or rubberized caulk may be used as a secondary layer to seal any potential gaps not covered by the initial coating of the paste composition.

Figure 2:
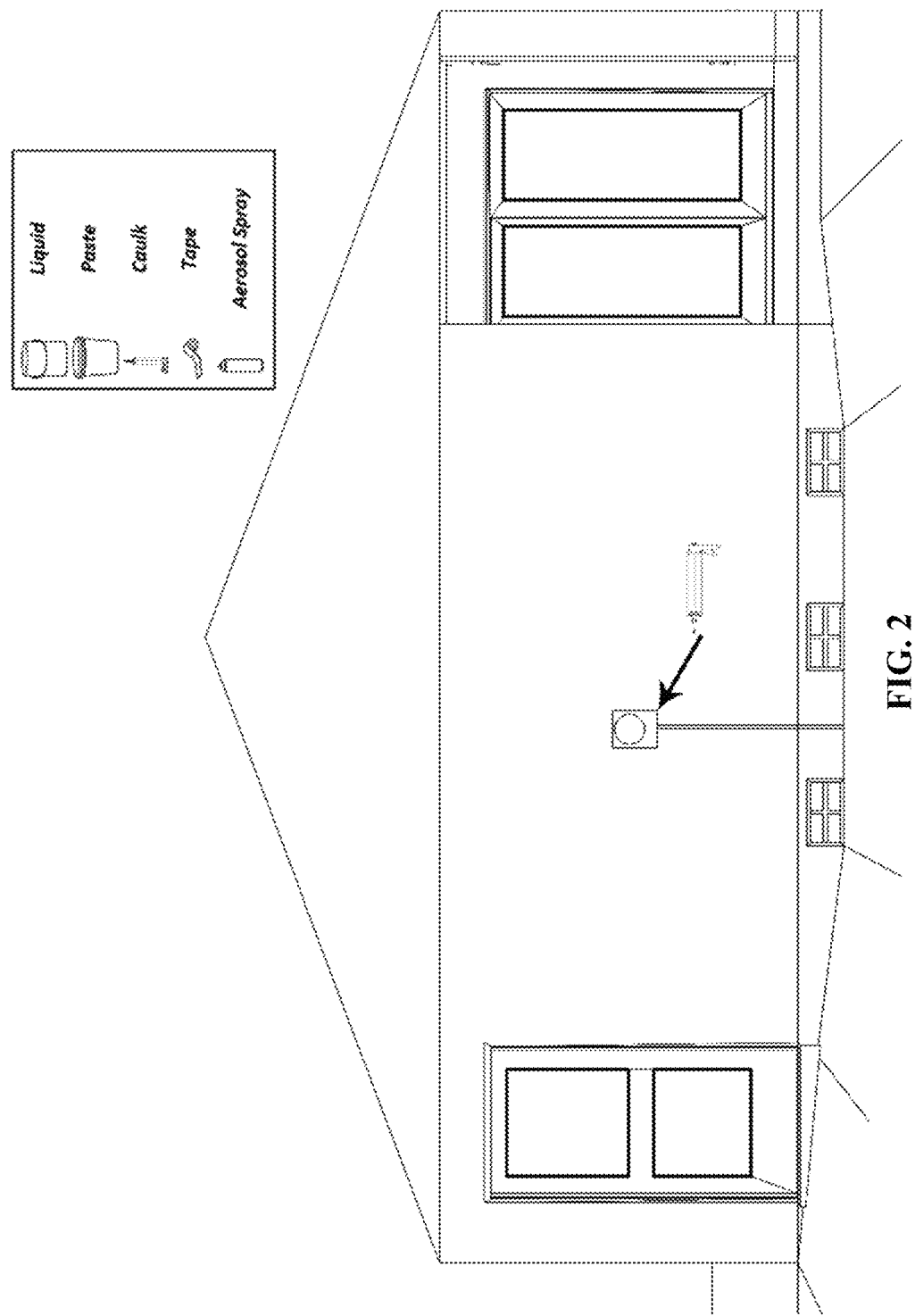
FIG. 2 illustrates application of a removable rubberized caulk composition to waterproof the house of FIG. 1.

FIG. 2 illustrates application of a removable rubberized caulk composition to waterproof or stormproof the example house shown in FIG. 1 and various structures or components of the house. For example, the removable rubberized caulk composition may be applied using a caulking gun around electrical boxes or other wall penetrations with a gap of less than 0.75 inches. The removable rubberized caulk composition may be smoothed with a putty knife or similar tool if necessary. The removable rubberized caulk composition may also be applied to the window joints or gaps, as well as doors, shutters, electrical components, cable equipment, gas lines and meters, sewage lines and pipes, and irrigation devices. After flooding or after water has receded or the storm ends, the removable rubberized paste composition may be removed from the house or other structure. The removable rubberized caulk composition may be used to augment the rubberized paste or to fill cracks or joints not adequately covered by the paste. In some examples, the aerosolized rubberized liquid-spray composition may be used as a secondary layer to seal any potential gaps not covered by the initial coating of the caulk composition.

Figure 3:
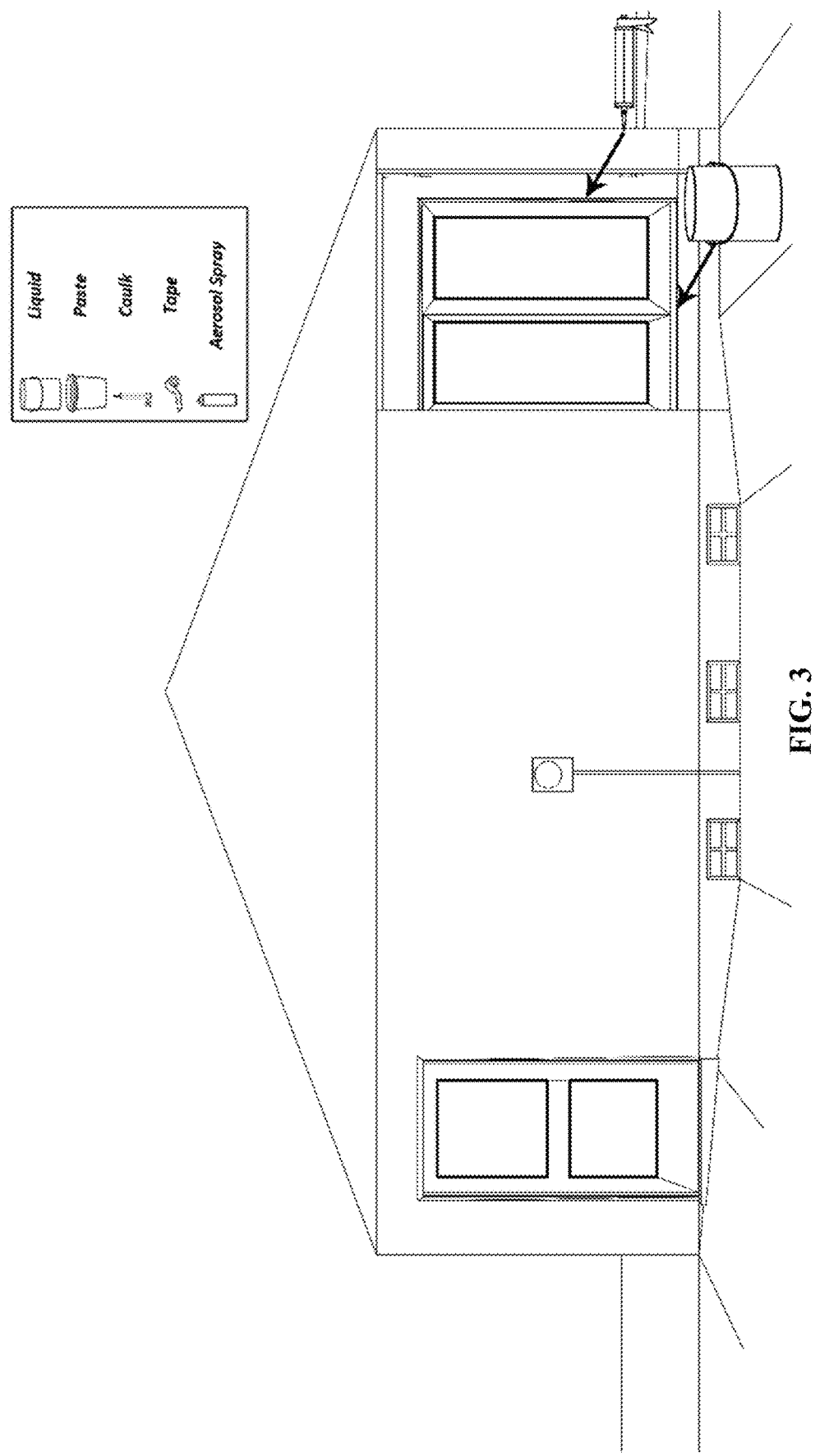
FIG. 3 illustrates application of a removable rubberized liquid composition and a removable rubberized caulk composition to waterproof the house of FIG. 1.

FIG. 3 illustrates application of a removable rubberized liquid composition and a removable rubberized caulk composition by caulking gun to waterproof the example house shown in FIG. 1 or other structure. Sliding door seams, door seams, and window seams may also be waterproofed using the removable rubberized liquid composition disclosed herein. The rubberized compositions disclosed herein may be used to seal window head jambs, brickmoulds, stiles, blind stops, interior stops, side jambs, muntins, sills, aprons, stool, inner sash, meeting rails, parting strips, outer sash, rails, interior casings, etc. The removable rubberized liquid composition may be poured into a sliding glass door track, base and seams, to cover at least about 0.75 inches of the door itself. In other examples, the removable rubberized liquid composition may be poured into a sliding glass door track, base and seams, to cover at least about 0.05, 0.10, 0.15, 0.20, 0.25, 0.30, 0.35, 0.40, 0.45, 0.50, 0.60, 0.65, or 0.70 inches of the door itself. The removable rubberized paste and caulk compositions may be used to augment the liquid composition or to fill cracks or joints not adequately covered by the liquid composition. After flooding or after water has receded or the storm ends, the removable rubberized liquid, paste, and caulk compositions may be removed from the house or structure.

Figure 4:
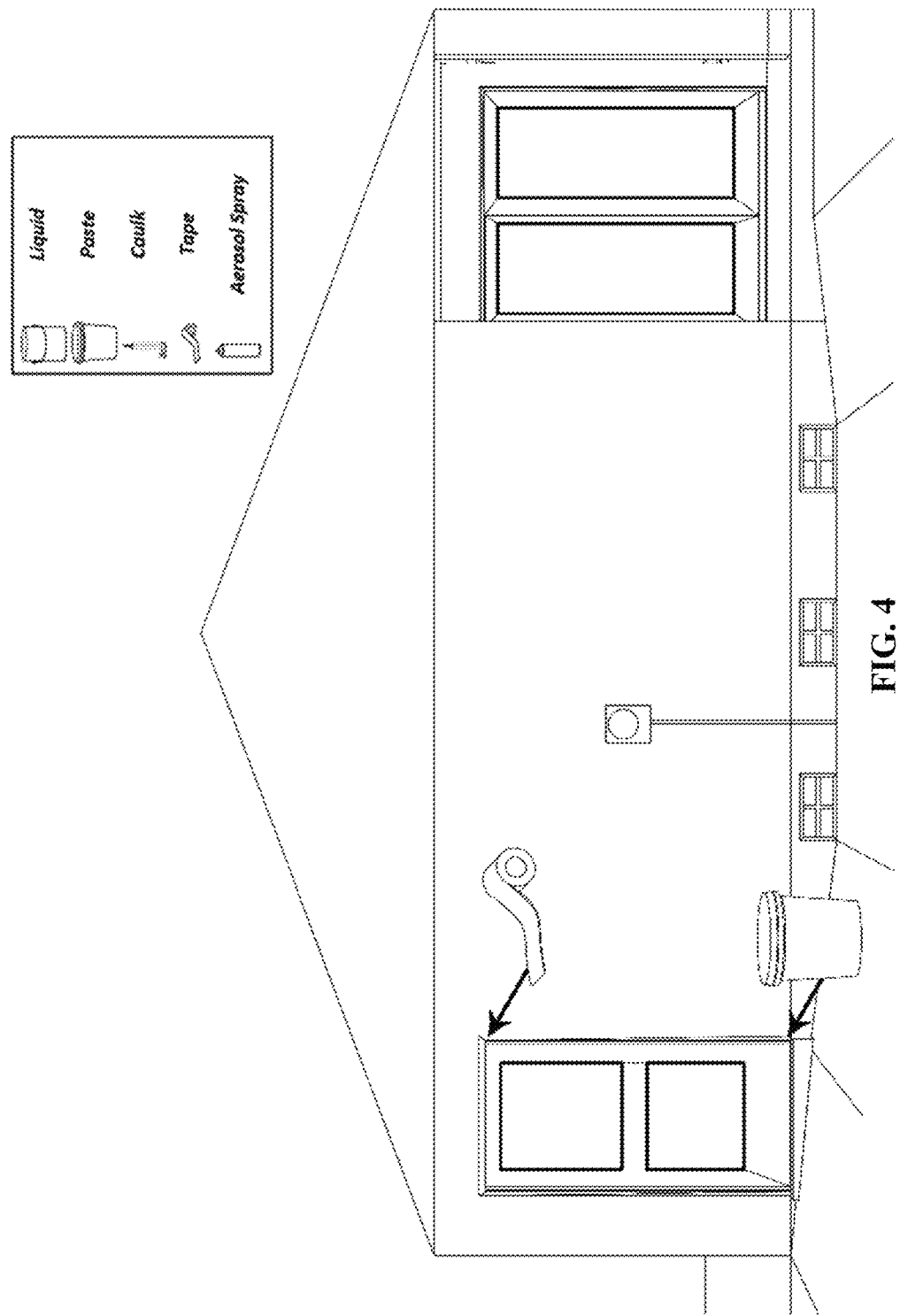
FIG. 4 illustrates application of a removable rubberized paste composition and a removable rubberized tape to waterproof the house of FIG. 1.

FIG. 4 illustrates application of the removable rubberized paste composition and a removable rubberized tape disclosed herein to waterproof the example house shown in FIG. 1. As discussed above, the removable rubberized paste composition may be applied to a door, sliding doors, or windows near the ground level by use of a trowel or similar tool. The removable rubberized paste composition may be liberally applied to the base of doors, door jams, the base of sliding doors, molding and window flanges, and anywhere ground water, flood waters, storm waters, or rain may be able to enter the house or structure. Similarly, the removable rubberized tape may be used to seal the outline of the doors, the outer edges/outline of sliding doors, windows, outer edges of the windows, and anywhere ground water, flood waters, storm waters, or rain may be able to enter the house or structure. In some examples, the aerosolized rubberized liquid-spray composition may be used as a secondary layer to seal any potential gaps not covered by the initial coating of the paste and tape compositions. Again, after flooding or after water has receded or the storm ends, the removable rubberized paste composition and rubberized tape may be removed from the structure.

Figure 5:
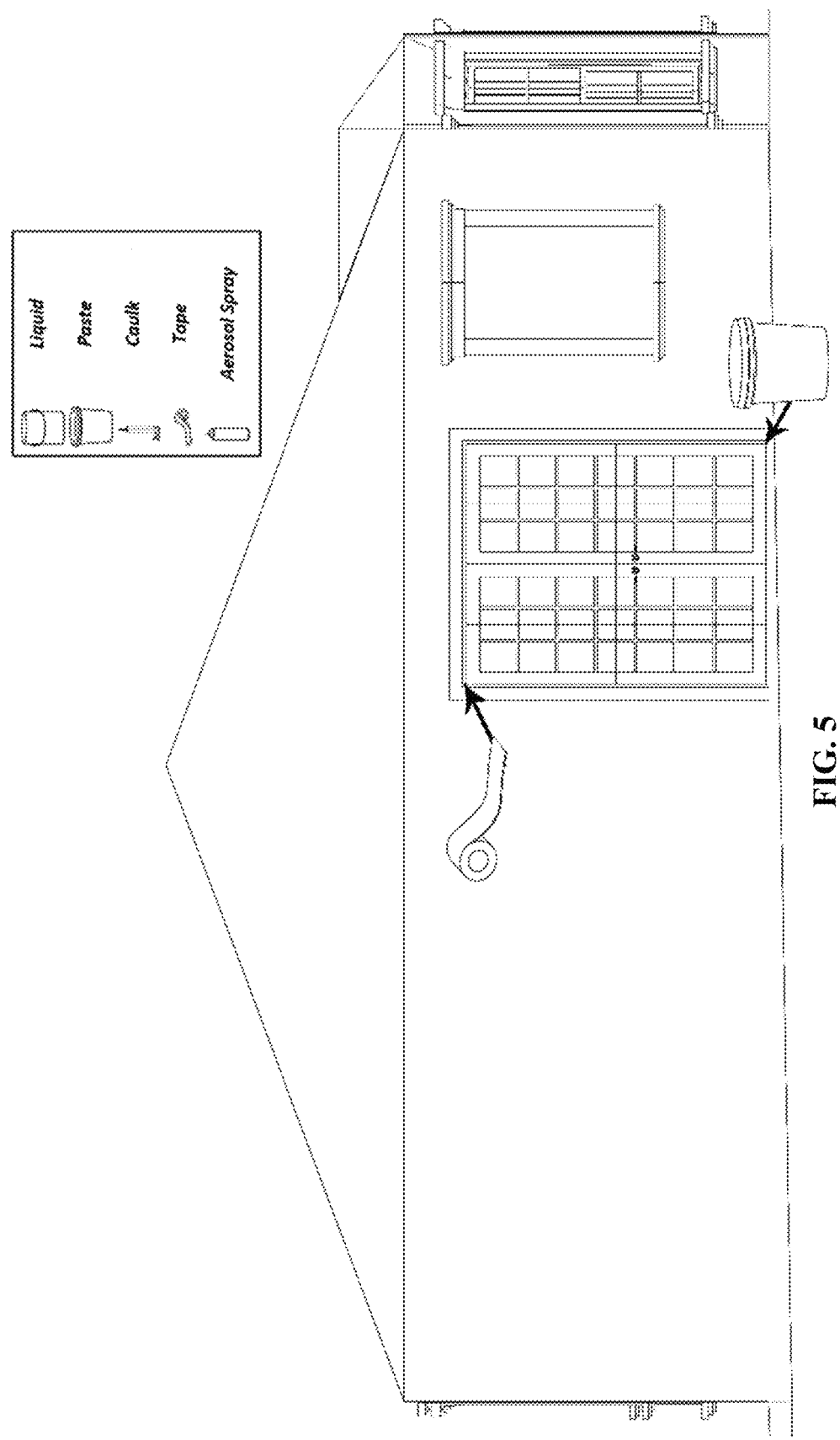
FIG. 5 illustrates application of a removable rubberized paste composition and a removable rubberized tape to waterproof another portion of the house of FIG. 1.

FIG. 5 illustrates application of a removable rubberized paste composition and a removable rubberized tape to waterproof sliding doors of an example structure or house. The removable rubberized paste composition may be applied to a sliding glass door track, base, sliding door seams, door seams, and window seams by use of a trowel or similar tool. The removable rubberized tape may be used to augment the paste composition or to fill cracks, seams, or joints around the sliding door(s) not adequately covered by the paste composition or at the top of the sliding doors. In some examples, the aerosolized rubberized liquid-spray composition may be used as a secondary layer to seal any potential gaps not covered by the initial coating of the paste and tape compositions. After flooding or after water has receded or the storm ends, the removable rubberized paste and tape compositions may be removed from the house or structure.

Figure 6:
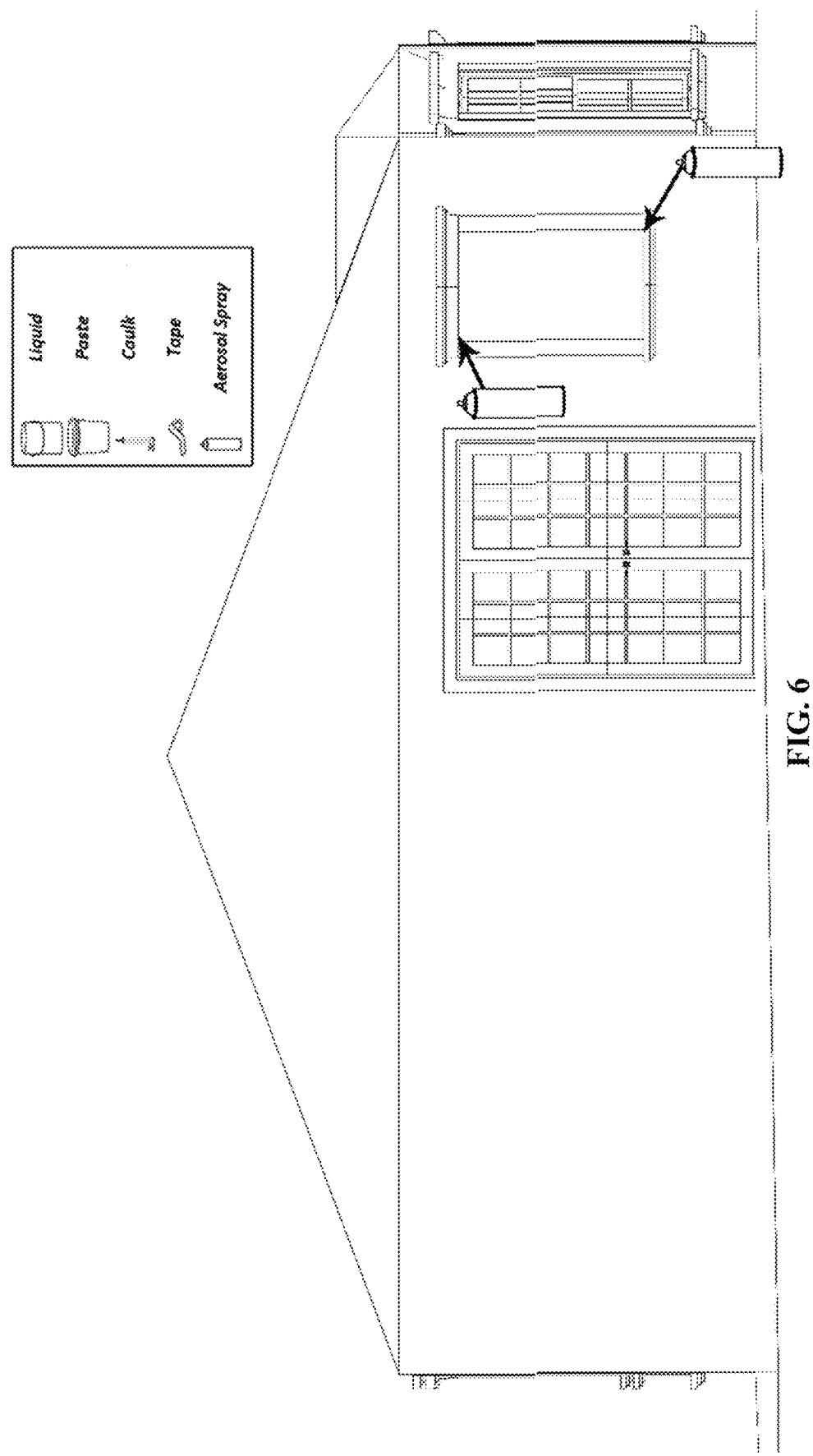
FIG. 6 illustrates application of a removable aerosolized rubberized liquid-spray composition to waterproof the house of FIG. 5.

FIG. 6 illustrates application of an aerosolized rubberized liquid-spray composition to waterproof the house or structure shown in FIG. 5. The aerosolized rubberized liquid-spray composition may be sprayed on window frames, head jambs, brickmoulds, stiles, blind stops, interior stops, side jambs, muntins, sills, aprons, stool, inner sash, meeting rails, parting strips, outer sash, rails, interior casings, and window screens. The removable aerosolized rubberized liquid-spray composition may be used to augment the removable rubberized liquid, paste, and caulk compositions or to fill cracks, seams, or joints not adequately covered by the liquid, paste, caulk, or tape compositions. After flooding or after water has receded or the storm ends, the removable aerosolized rubberized liquid-spray composition may be removed from the house or structure.

Figure 7:
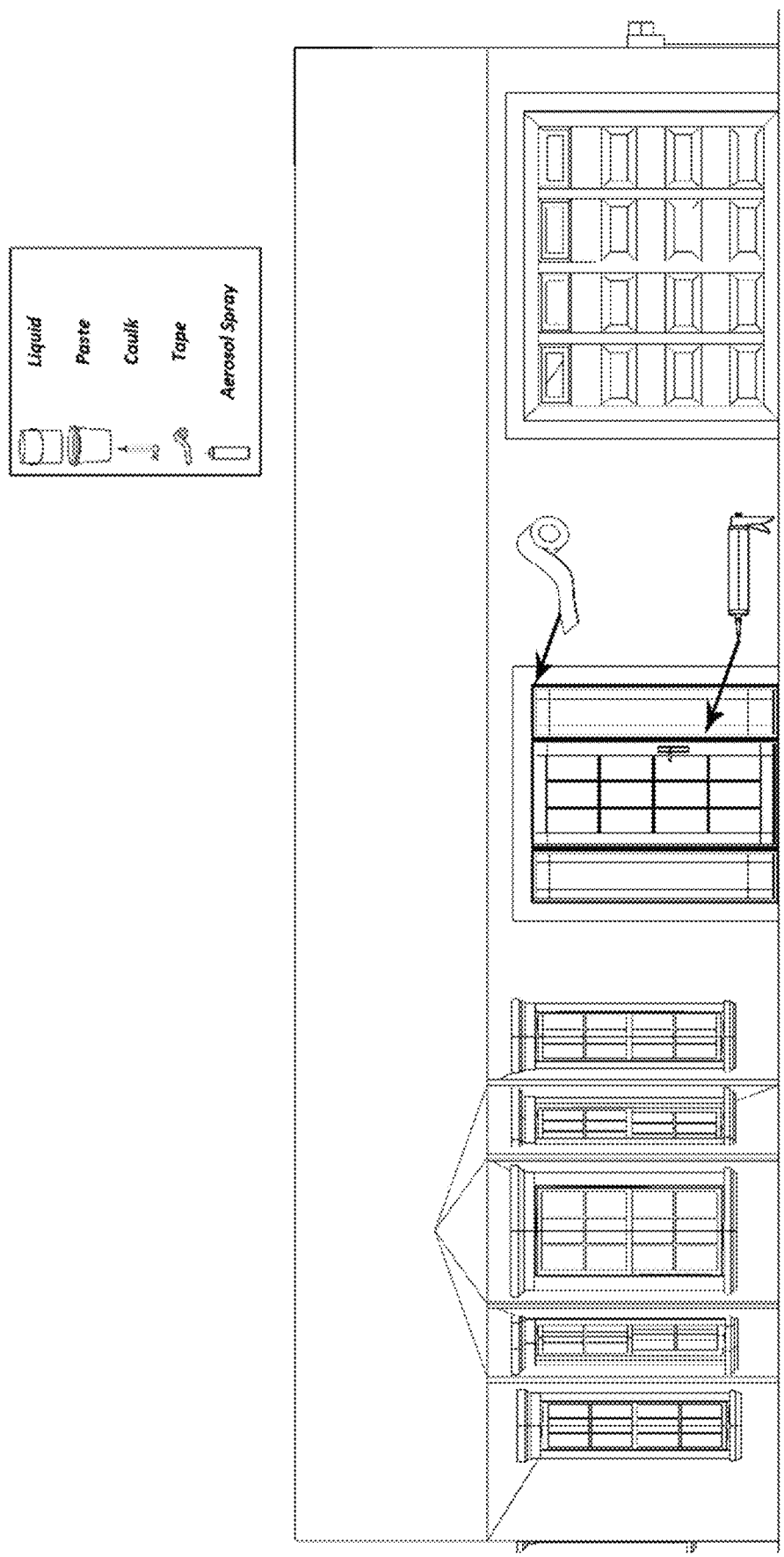
FIG. 7 illustrates application of a removable rubberized caulk composition and a removable rubberized tape to waterproof a different portion of the house of FIG. 1.

FIG. 7 illustrates application of a removable rubberized caulk composition by caulking gun and a removable rubberized tape to waterproof a house or other structure, including windows, doors, shutters, and garage doors. For example, the removable rubberized caulk composition may be applied using a caulking gun around window frames, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures with penetrations with a gap of less than about 0.75 inches. In other examples, the removable rubberized caulk composition may be poured into structures having at least about 0.05, 0.10, 0.15, 0.20, 0.25, 0.30, 0.35, 0.40, 0.45, 0.50, 0.60, 0.65, 0.70, or 0.75 inch gaps. The removable rubberized caulk composition may be smoothed with a putty knife or similar tool if necessary. The removable rubberized tape may be used to augment the caulk composition or to fill cracks, seams, or joints around the door frames, window frames, and garage door not adequately covered by the caulk composition or at the top of the structure doors and garage doors. After flooding or after water has receded or the storm ends, the removable rubberized caulk composition and tape may be removed from the house or other structure. The removable rubberized paste and liquid compositions, as well as the aerosolized rubberized liquid-spray composition may be used to augment the rubberized caulk or to fill cracks or joints not adequately covered by the caulk and tape.

Figure 8:
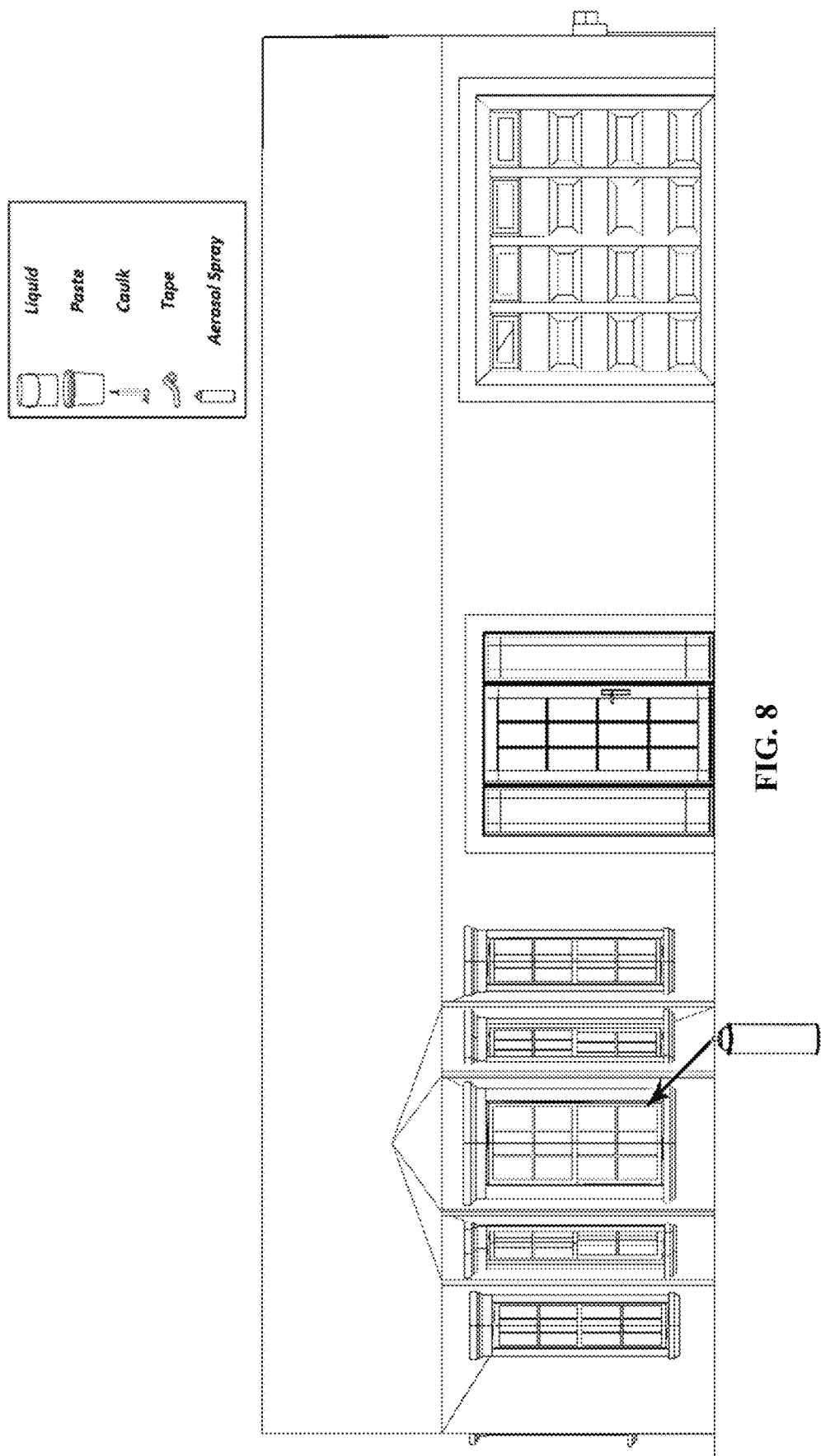
FIG. 8 illustrates application of a removable aerosolized rubberized liquid-spray composition to waterproof the house of FIG. 7.

FIG. 8 illustrates application of a removable aerosolized rubberized liquid-spray composition to waterproof the example house or other structure shown in FIG. 7, including windows, doors, shutters, and garage doors. For example, the aerosolized rubberized liquid-spray composition may be sprayed around window frames, screens, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures. The removable rubberized liquid, paste, caulk, and tape may be used to augment the aerosolized rubberized liquid-spray composition or to fill cracks, seams, or joints around the door frames, window frames, and garage door not adequately covered by the aerosolized rubberized liquid-spray composition or at the top of the structure doors and garage doors. After flooding or after water has receded or the storm ends, the hardened aerosolized rubberized liquid-spray composition may be removed from the house or other structure.

Figure 9:
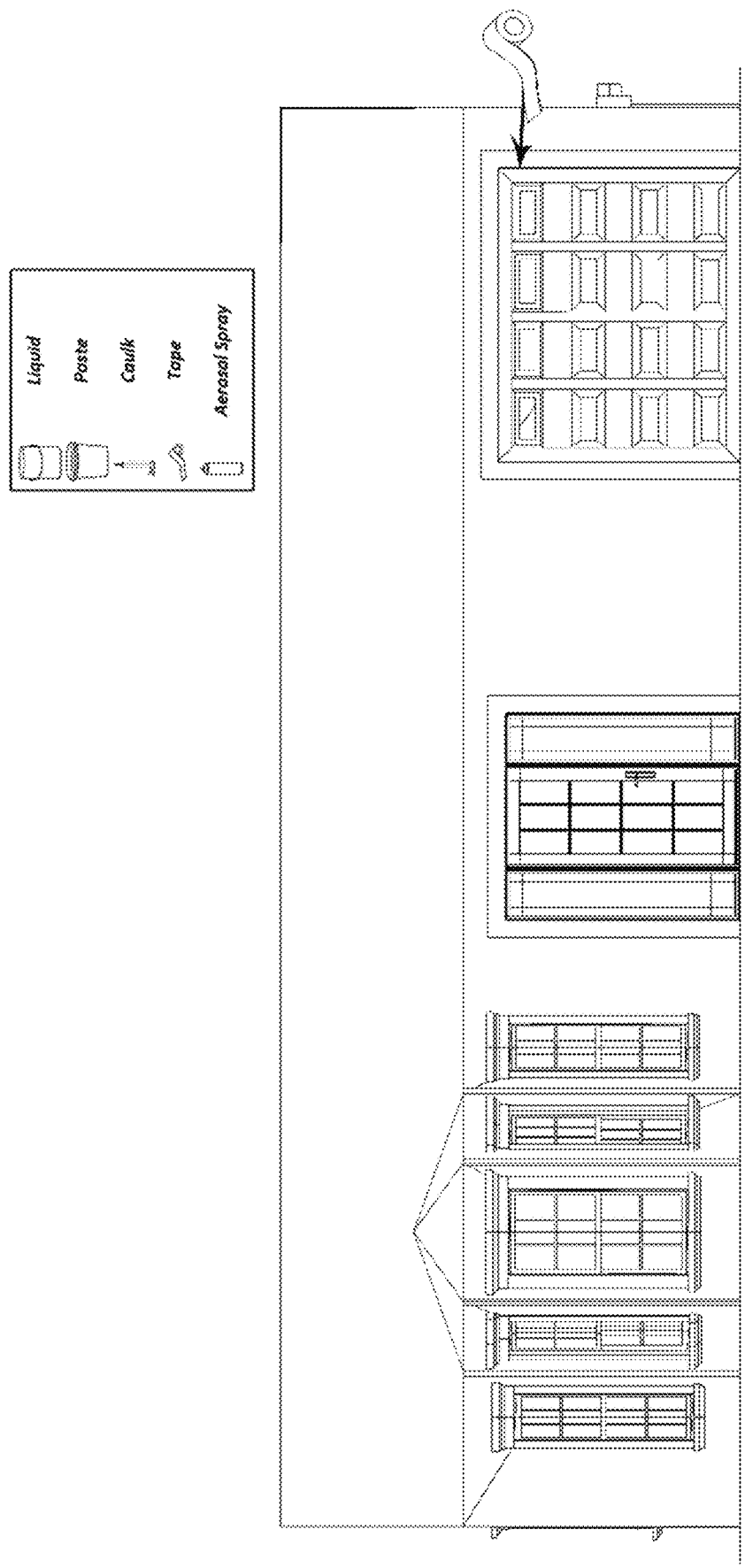
FIG. 9 illustrates application of a removable rubberized tape to waterproof the house of FIG. 7.

FIG. 9 illustrates application of a removable rubberized tape to waterproof the perimeter of a garage door of the example house or other structure shown in FIG. 8. The rubberized tape may be manually applied around the perimeter of a garage door, window frames, screens, head jambs, brickmoulds, stiles, blind stops, interior stops, side jambs, muntins, sills, aprons, stool, inner sash, meeting rails, parting strips, outer sash, rails, interior casings, door seams, shutters, garage doors, garage door seams, or other structures. The removable rubberized liquid, paste, caulk, and aerosolized rubberized liquid-spray compositions may be used to augment the rubberized tape or to fill cracks, seams, or joints around the garage door frame, door frames, window frames, and gaps around the garage door not adequately covered by the rubberized tape. After flooding or after water has receded or the storm ends, the rubberized tape may be removed from the house or other structure.

Figure 10:
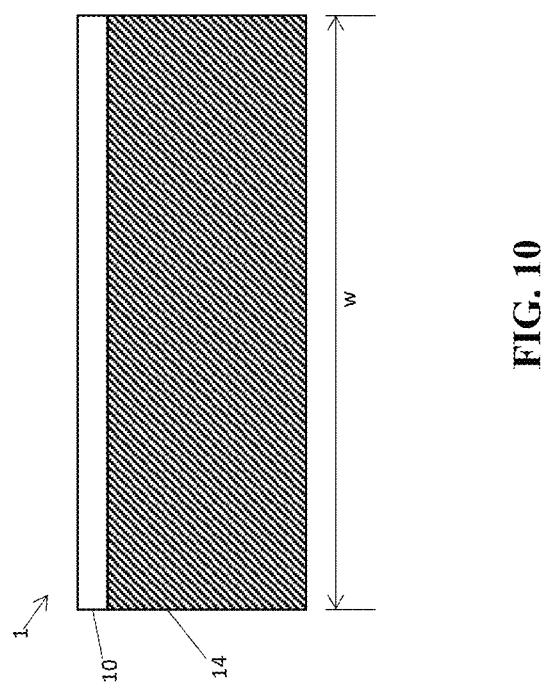
FIG. 10 schematically shows a cross-sectional view of a removable rubberized tape that may be used in various methods disclosed herein.

FIG. 10 schematically shows a cross-sectional view of a removable rubberized tape 1 that may be used in the various methods disclosed herein. The tape 1 may include a relatively thick, rubberized adhesive layer 14 and a backing layer 10. Optionally, a release liner (not shown) is placed over the opposite surface of the adhesive layer 14 to protect the adhesive layer before use. Usually, a release liner is not used, but instead the tape is wound into a roll such that the backing layer 10 covers and protects the adhesive layer 14 until such time that the adhesive layer is exposed by unrolling the tape. In other examples, the backing layer 10 may include a greater thickness than the adhesive layer 14. In some examples, the backing layer 10 may be rubber based. In other examples, the backing layer 10 is non-rubber based. In some examples, the backing layer 10 may be impermeable to water.

The tape may be highly flexible, allowing it to readily conform to the shape of the article to which it is applied. In some examples, the tape may include a capability to stretch or elongate. The adhesive layer is capable of forming a strong bond with a variety of surfaces under a variety of conditions. In some examples, the tape may be applied to a surface that is in contact with water, such as in the case where a storm has already begun. In still other examples, the tape may be applied to a dry surface.

In some examples, a tape is applied to a structure or a portion thereof, or an article for purposes of waterproofing, including providing a temporary, removable waterproof barrier, or modifying an article to make it waterproof by covering preformed holes or by adding a moisture-impermeable layer to the article or a portion thereof. The tape generally may provide a durable, breathable, weatherproof barrier that is resistant to rain, snow, sun, wind, air moisture, UV degradation, and natural weathering over a wide temperature range.

The dimensions of the layers are not particularly limited and may vary widely. The rubberized adhesive layer 14 should have an appropriate thickness to provide the desired adhesive, waterproofing, moisture barrier, insulating, and/or reinforcing properties needed for a particular application. By way of non-limiting example, the thickness of the adhesive layer 14 may range from about 5 to about 50 mils, more often from about 10 to about 40 mils, and typically ranges from about 15 to about 30 mils. The thickness of the backing layer 10 typically is less than that of the adhesive layer. For example, the thickness of the backing layer 10 may range from about 1 to about 20 mils, more usually from about 2 to about 15 mils, and often from about 3 to about 10 mils. In one example, the adhesive layer 14 has a thickness of 21 mils and the backing layer has a thickness of 6 mils.

The overall width w of the tape may be appropriately selected depending on intended applications, and often ranges from about 2 to about 18 inches, more usually from about 4 to about 15 inches, from about 5 to about 13 inches, or from about 6 to about 12 inches. In some examples, a super-wide tape is used, e.g., 12" width, which provides additional strength and waterproofing that enable a much wider range of applications than heretofore were possible, particularly applications needing higher adhesive strength and/or when the tape is applied to a surface in the presence of water, including flowing water. Non-limiting examples of tape widths include 4", 8", and 12". Discrete lengths of the tape (5' or 10', for example) may be wound into rolls for ease of distribution and handling.

The particular type of adhesive used is not limited provided that it has sufficiently high adhesive strength and water resistance characteristics. In some examples, the adhesive layer 14 may be rubber based. In other examples, the adhesive layer 14 is non-rubber based. In some examples, the adhesive layer 14 may be impermeable to water. In some examples, the adhesive layer 14 may include a chemical component to enhance the removability of tape 1. In other examples, the adhesive layer 14 may specifically lack a particular chemical component that surprisingly enhances the removability of tape 1. a chemical component to enhance the removability of the tape 1. In yet other examples, the adhesive is modified to enhance its removable properties to prevent damage to a structure of component upon removal. A number of waterproof adhesives are commercially available. Acrylic adhesives, e.g., cyanoacrylates such as methyl-2-cyanoacrylate and ethyl-2-cyanoacrylate, adhere well to a range of materials such as wood, metal, glass, plastic, and various other surfaces, hold up well to moisture and drastic temperature changes, and generally are resistant to ultraviolet light, solvents, and chemicals. Synthetic rubber adhesives may be based on ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. In one example, a thermoplastic butyl hybrid adhesive is used. If desired, the rubber layer may be formulated in a variety of colors tailored to particular applications or consumer preferences. For example, rubber compositions may be clear, white, off-white, black, gray, blue, green, red, almond, brown, silver, yellow, terra cotta, or other suitable or desired color. The selection of appropriate pigment(s) or other colorant(s) needed to achieve a desired color will be apparent to persons skilled in the art with the aid of no more than routine experimentation.

The backing layer 10 functions to support the adhesive layer 14 and to provide a non-adhesive surface to the tape 1, e.g., to provide an outer surface of a patch after application over a damaged area. The composition of the backing layer 10 is not particularly limited, but generally should be compatible with the adhesive layer. For example, the backing layer may be constructed from a polyolefin such as polyethylene.

Release liners (when used) may be prepared from suitable materials such as paper, poly-coated paper, polyester film, or polyolefin (e.g., high density polyethylene (HDPE)) film. The release liner may feature a release coating, such as a silicone release coating, to create a low-tack bond with the adhesive layer.

In addition to the applications and benefits as set forth herein, there are benefits in these techniques as demonstrating the uses, the ease of the use, and the advantages of the removable rubber compositions by each of these processes. By making articles and structures waterproof, the techniques described herein further provide benefits associated with avoiding contact with moisture, including making structures waterproof, and making articles rust-resistant, mold-resistant, mildew-resistant, and the like.

To demonstrate the utility and effectiveness of the removable rubberized compositions and tape disclosed herein, a basin, container, water holding enclosure surrounding the building structure, or similar area may be prepared by digging an appropriate area large enough to allow a structure to be positioned within the water holding enclosure. A concrete, metal, or plastic container may also be used as a basin or water holding enclosure. In either case, the area and depth of the basin or container should be large enough to hold enough water to partially cover the structure within the basin or container area. A structure may be placed in the water holding enclosure. Alternatively, a structure may be constructed inside the basin, water holding enclosure surrounding the building structure, or container area. In some examples, the building structure may be a house, a mobile home, a shed, boathouse, a barn, a trailer, etc. In certain examples the house may be constructed without a roof or a portion of a roof to allow visibility for visual monitoring of the interior of the structure by an individual, or with cameras or other monitoring devices. In another example, the house may be constructed with a partial, opened roof to facilitate observation of the inside of the house. In other examples, the structure may be covered and may include cameras or other monitoring devices on the interior of the structure, the exterior of the structure, or in both locations throughout the structure and/or in each room of the structure. The exterior of the structure may then be waterproofed in accordance with the methods disclosed herein. The removable rubber compositions may be applied with a paint roller, trowel, or caulking gun. In some examples, the removable rubber compositions may be applied to the structure from the ground level to about three to four feet above the ground level. In other examples, the removable rubber compositions may be applied to the structure from the base of the foundation to about at least three feet above the ground level and/or foundation. In some examples, the interior of the structure may be waterproofed in accordance with the methods disclosed herein. In still other examples, both the interior and the exterior of the structure may be waterproofed in accordance with the methods disclosed herein. The removable rubber compositions may then be allowed to cure, harden, or solidify.

After waterproofing, the basin, water holding enclosure surrounding the building structure, or container may be filled with enough water to partially or fully cover the structure positioned in the water holding enclosure. Water may be released by various means to flood the water holding enclosure such as by flooding with fire hoses and trucks, hoses attached to fire hydrants or fire engines, or by water trucks or prepositioned containers filled with water and transported by truck or attached to a truck. An individual may also be prepositioned inside the building structure prior to water release to monitor the release of water and to verify no water has leaked into the building structure. In other examples, the building structure may include devices to generate lightening and to generate simulated rain showers. In some examples the devices may be positioned around the exterior of the building structure. The structure may be monitored or inspected to confirm no water or a minimal amount of water has penetrated the structure. The water may remain in the water holding enclosure or container for at least, greater than, less than, equal to, or any number in between about 1, 2, 3, 4, 5, 10, 15, 20, 25, 30, 35, 40, 45, 50, 55, 60, 65, 70, 75, 80, 85, 90, 95, 100, 105, 110, 115, and 120 minutes. In other examples the water may remain in the water holding enclosure surrounding the building structure or container for at least, greater than, less than, equal to, or any number in between about 0.5, 1, 2, 3, 4, 5, 6, 7, 8, 9, 10, 11, 12, 13, 14, 15, 16, 17, 18, 19, 20, 21, 22, 23, 24, 36, and 72 hours. In still other examples, the water may remain in the water holding enclosure surrounding the building structure or container for at least, greater than, less than, equal to, or any number in between about 0.5, 1, 2, 3, 4, 5, 6, 7, 8, 9, 10, 11, 12, 13, and 14 days. In another example, the water may be drained from the water holding enclosure surrounding the building structure or container. The water may drain into a natural pond or lake positioned near the building structure and at a lower grade to facilitate drainage. The rubberized compositions and tape used to waterproof the structure may then be removed from the structure and the interior and exterior of the structure may be visually or remotely inspected for water penetration.

Figure 11:
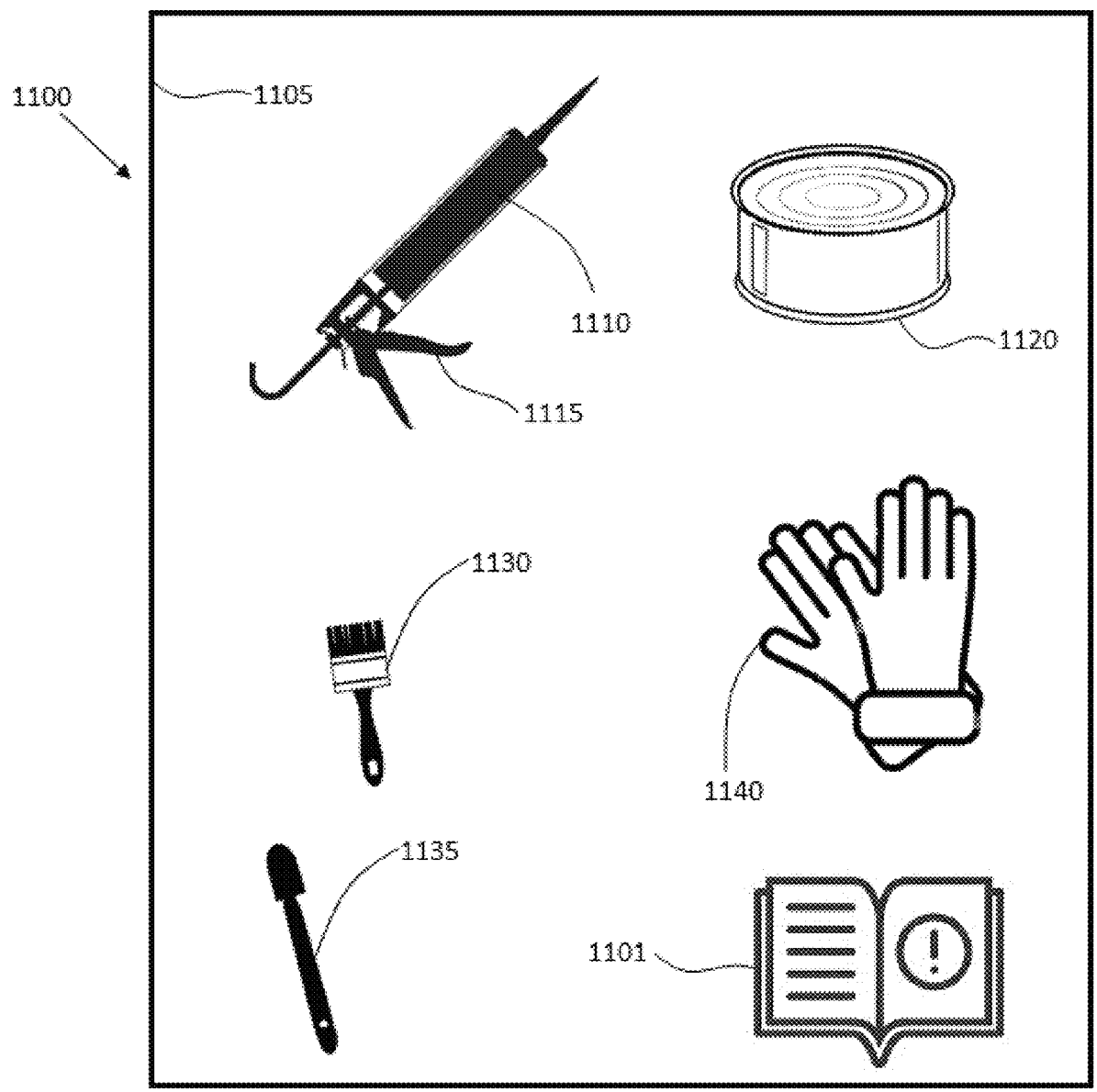
FIG. 11 is a schematic of a storm-proofing or water proofing kit in accordance with embodiments of the invention.

FIG. 11 illustrates a storm-proofing or water proofing kit in accordance with embodiments of the invention. Waterproofing kit or storm-proofing kit 1100 may include combinations of the compositions described above (i.e., sprayable, aerosol-based liquid rubber compositions, viscous liquid rubber compositions, malleable, rubberized pastes and caulks, and rubberized tapes) that may be may be used (in any combination described above) to form a temporary, removable waterproof barrier for a wide variety of structures or objects such as doors, windows, mobile homes, recreational vehicles, campers, tents, vinyl awnings, covers and tarps, and the like. For example, packaging assembly or box 1105 of kit 1100 may be constructed of paper, cardboard, plastic, or other packaging material known in the art. Unitary packaging assembly 1105 may include a tray to hold components of kit 1100 to prevent shifting during movement of transport. Packaging assembly 1105 may be configured to store the kit 1100 contents after use if compositions remain and may be used for another storm-proofing or water proofing event. Kit 1100 may include cartridge 1110 comprising an injectable rubber caulk. Alternatively, cartridge 1110 may be filled with and contain a malleable rubber paste. Kit 1100 may also include caulking gun 1115 that may be configured to engage and dispense the contents of cartridge 1110. Kit 1100 may also include container 1120 that may be filled with a viscous liquid rubber composition. Container 1120 may be configured as a glass or plastic jar with a removable cap, a metal container with a removable lid (e.g., screw top or friction fit), pouch, sleeve, or a tube-like device configured to hold and dispense the viscous liquid rubber composition. Container 1120 may also be a paint can or similar device.

As also shown in FIG. 11, kit 1100 may include paintbrush 1130 that may be configured to apply the viscous liquid rubber composition within container 1120 to a surface or object, or layered upon the compositions described herein. Kit 1100 may also include gap filler tool 1135 that may be configured to assist with pushing the rubber caulk or rubber paste into gaps or cracks, and a pair of gloves 1140 to protect a user's hands during application of the caulk, paste, or liquid compositions. Gloves 1140 may resemble latex surgical gloves, canvas work gloves, nitrile gloves, etc. In some examples, protective gloves 1140 may be intended to be disposable after use. In other examples, protective gloves 1140 may be used repeatedly. In some examples, the kits disclosed herein may also include a utility knife or other cutting tool.

Printed instructions 1101 may also be incorporated within the kit 1100. In some examples, kit assembly 1105 may also include printed instructions on the exterior. Kit assembly 1105 may further include a quick response (QR) code on the exterior providing an internet link to additional or original instructions, and/or instructional videos related to the specific instructions 1101. As shown in FIG. 11, each kit component may be combined into unitary packaging assembly 1105. Printed instructions 1101 may describe and instruct for an individual how to apply the compositions described herein to form a temporary, removable waterproof barrier for a wide variety of structures or objects. In particular, kit 1100 printed instructions 1101 may include directions to apply injectable rubber caulk contained in cartridge 1110 (or a malleable rubber paste) into gaps or cracks of a structure or object in accordance with the methods described above. Gap filler tool 1135 may be used to assist with pushing the rubber caulk or rubber paste into gaps or cracks. After application of the caulk or paste from cartridge 1110 using caulking gun 1115, instructions 1101 may direct application of the liquid composition within container 1120 using paintbrush 1130 to coat over or cover the caulk or paste filled gaps or cracks of the structure or object. Alternatively, printed instructions 1101, or additional printed instructions (not shown) may further provide instructions directing the application of each type of composition, as described above, in any combination or as individual components.

Figure 12:
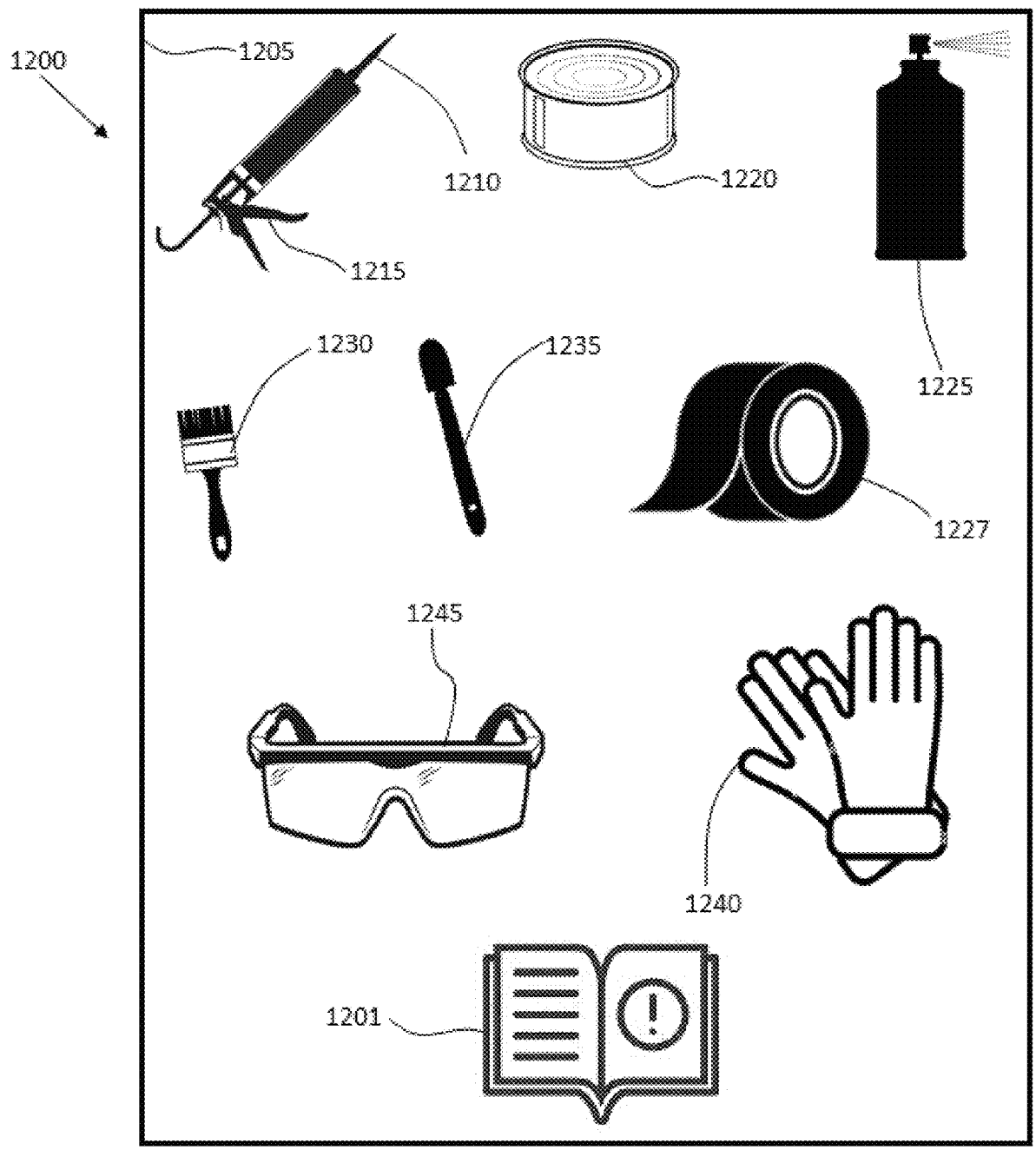
FIG. 12 is a schematic of another a storm-proofing or water proofing kit in accordance with embodiments of the invention.

FIG. 12 illustrates an alternative storm-proofing or water proofing kit 1200 in accordance with embodiments of the invention. Kit 1200 may include unitary packaged assembly 1205 containing cartridge, can, jar, plastic container, or tube like device 1210 containing an injectable rubber caulk or a malleable rubber paste, container, jar, tube, or pouch 1220 comprising a viscous liquid rubber composition, roll of rubberized adhesive tape 1227, and/or can or bottle 1225 containing a sprayable aerosol-based rubberized liquid. Kit 1200 may also include caulking gun 1215 configured to engage and dispense contents of the cartridge 1210, and paintbrush 1230. Kit 1200 may also include gap filler tool 1235 that may be configured to assist with pushing the rubber caulk or the rubber paste into gaps or cracks. Kit 1200 may further include a pair of gloves 1240 as previously described, and safety goggles 1245. Again, in some examples, the kits disclosed herein may also include a utility knife or other cutting tool. Unitary packaging assembly 1205 may include a tray or other device to hold components of kit 1200 to prevent shifting during movement of transport. Packaging assembly 1205 may be configured to store the kit 1200 contents after use if compositions remain and may be used for another storm-proofing or water proofing event.

Printed instructions 1201 may also be incorporated within the kit 1200. In some examples, kit assembly 1205 may also include printed instructions on the exterior of the packaging (not shown). Kit assembly 1205 may further include a quick response (QR) code on the exterior providing an internet link to additional or original instructions, and/or instructional videos related to the specific instructions 1201. As described above, each kit component may be combined into unitary packaging assembly 1205. Printed instructions 1201 may describe and instruct for an individual how to apply the compositions described herein to form a temporary, removable waterproof barrier for a wide variety of structures or objects. For example, kit 1200 printed instructions 1201 may include directions to apply injectable rubber caulk contained in cartridge 1210 (or a malleable rubber paste) into gaps or cracks of a structure or object in accordance with the methods described above. Gap filler tool 1235 may be used to assist with pushing the rubber caulk or rubber paste into gaps or cracks. After application of the caulk or paste from cartridge 1210 using caulking gun 1215, instructions 1201 may direct application of the liquid composition within container 1220 using paintbrush 1230 to coat over or cover the caulk or paste filled gaps or cracks of the structure or object. Alternatively, printed instructions 1201, or additional printed instructions (not shown) may further provide instructions directing the application of each type of composition, as described above, in any combination or as individual components. For example, instructions 1201 may include directions on the application of the sprayable aerosol-based rubberized liquid within can 1225 and application of rubberized adhesive tape 1227. In some examples, the kits disclosed herein may also include a utility knife or other cutting tool.

Alternative kits may include any combination of the components described above, or may contain multiple components of the same type. In some examples, individual components may be eliminated from the kits. In certain example, the kits may contain additional components such as additional instructions, or additional instructions for other compositions on the first set of printed instructions. The printed instructions may include multiple foreign languages in addition to English, such as Spanish, French, German, Arabic, Chinese, Japanese, Korean, etc. The kits may further include additional tools or devices such as metal, plastic, or wooden spatulas/filler tools, trowel, knives, or other cutting devices. Some kits may include a mask such as a cloth mask or N95 mask configured to limit the inhaling of composition fumes or aerosols. In other examples, each kit component may be combined into a unitary packaging assembly or box. As previously discussed, the kit compositions may be removed after application and use without damaging the structure or object adhered to. For example, the disclosed compositions may be removed without peeling off paint, damaging tile, trim, etc. In addition, the disclosed compositions may be removed from a structure or object without leaving a residue behind that would normally require additional cleaning or maintenance to remove. In one example, the sprayable, aerosol-based liquid rubber compositions, viscous liquid rubber compositions, malleable, rubberized pastes and caulks, and rubberized tapes may be colored yellow for easy visual identification and subsequent removal.

In other embodiments, the kit may include instructions directed to the application of the compositions as described above. In particular, the instructions may include directions to apply the injectable rubber caulk or a malleable rubber paste to gaps or cracks of a structure or object in accordance with the methods described above. After application of the caulk or paste, the instructions may direct application of the liquid composition using the paintbrush or roller to coat over or cover the caulk or paste filled gaps or cracks. Alternatively, the printed instructions or additional printed instructions may further provide instructions directing the application of each type of composition, as described herein, in any combination or as individual compositions.

In another embodiment, the kit may be provided in a unitary packaged assembly containing only a limited number of compositions and components. In one example, the unitary packaged assembly may include a specialized kit that only includes the cartridge or container of injectable rubber caulk or malleable rubber paste, a container of the viscous liquid rubber composition, a caulking gun, a pair of gloves, a paintbrush or a roller, a gap filler tool, and printed instructions. In another example, the unitary packaging assembly may only include one of the injectable rubber caulk, or the malleable rubber paste, or the container of the viscous liquid rubber composition, or the roll of rubberized adhesive tape, or the can or bottle of the sprayable aerosol-based rubberized liquid, as well as a pair of gloves and printed instructions. Respectively, the kit may only include the caulking gun, or the paintbrush and/or a roller. Alternatively, the kits may or may not include a pair of safety goggles.

Figure 13:
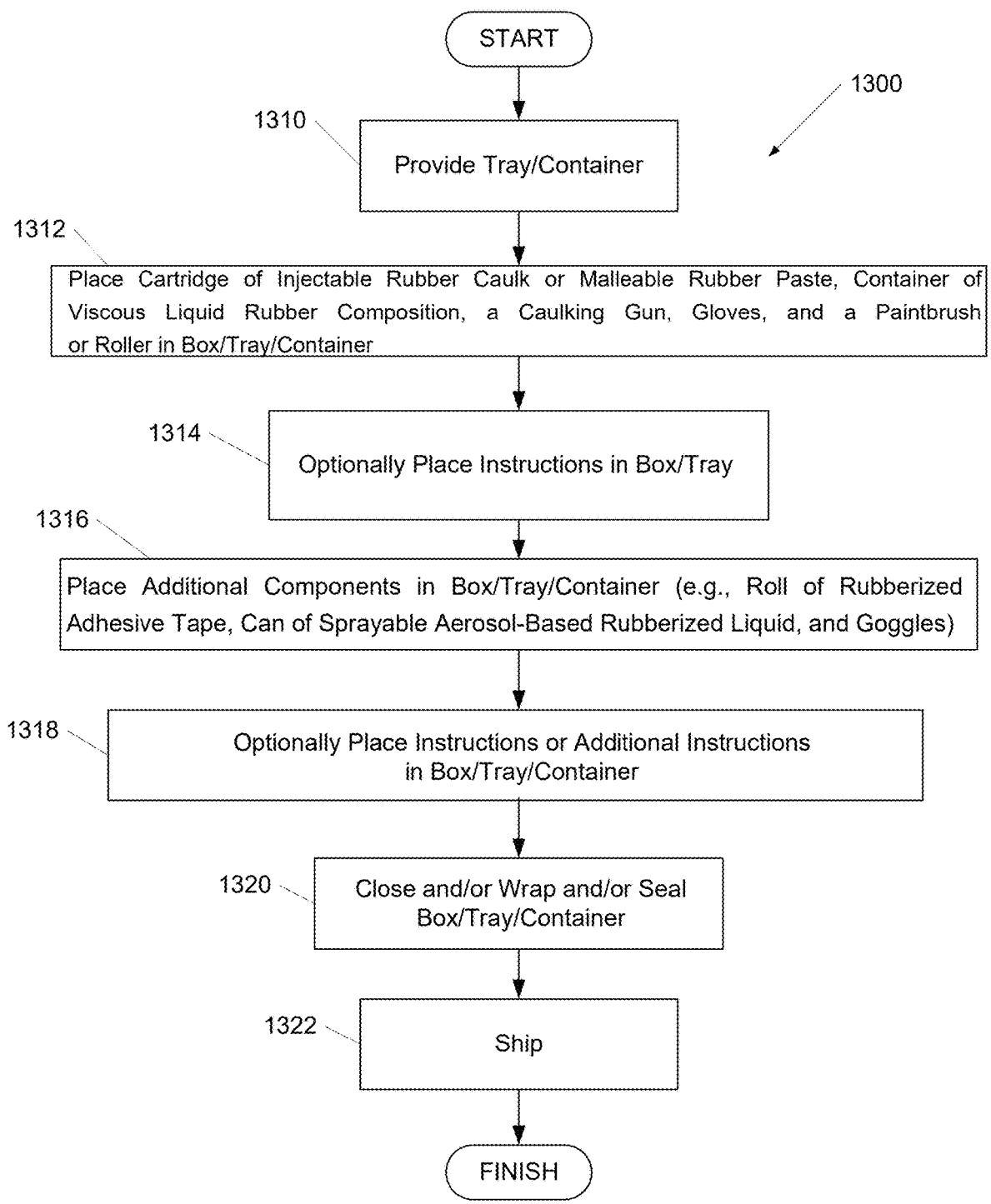
FIG. 13 illustrates a method of manufacturing a unitary packaging assembly for a storm-proofing or water proofing kit, with corresponding components and instructions disposed therein, in accordance with embodiments of the invention.

Turning now to FIG. 13, illustrated therein is a method 1300 for manufacturing a packaged assembly comprising a storm or waterproofing kit in accordance with embodiments of the invention. The individual steps disclosed herein may be omitted or performed in any order. At step 1310, the manufacturer may provide a tray or container having at least one compartment or a plurality of compartments for accommodating one or more components of the kit. Alternatively, the method may include placing all the components within a singular box/container without any tray or separate compartments. At step 1312, components may be positioned in the tray or container compartments. For example, the tray or container may include a plurality of compartments configured to removably engage or receive a cartridge comprising an injectable rubber caulk or a malleable rubber paste, a container comprising a viscous liquid rubber composition, a caulking gun configured to engage and dispense contents of the cartridge, a paintbrush or a roller, and gloves. In some examples, the compartments may be contoured to create a friction fit corresponding to the kit components. In some examples, the kit components may be held into place on/in the tray by other means such as a fastener, clip, tie, adhesive, or other fastening means well-known in the art. In other examples, the components are simply placed within the container with no dedicated compartment or securing means. At step 1314, the manufacturer may optionally insert instructions in the tray or container.

At step 1316, additional components may be positioned in the tray or container. For example, the tray or container may further include a roll of rubberized adhesive tape, a can comprising a sprayable aerosol-based rubberized liquid, and a pair of safety goggles positioned in the tray or container. Further, other components or devices may be included, such as coupons, towels, rags, other printed materials or advertisements, tools such as a spatula, knife, box cutter, razor blade, liquid basin, and so forth. These other components may be disposed in various compartments within the tray or container. At step 1318, the manufacturer may optionally insert instructions or additional instructions in the tray or container.

At step 1320, the tray or container may be enclosed, wrapped, and/or sealed. The tray or container, or some of the components may be enclosed by a wrap such as a clear plastic wrap, or a shrink-wrap. Alternatively, the tray or container may be positioned or disposed within an outer packaging such as a box. In some instances, the manufacturer may affix an instruction tag or sticker, printed instructions, or combinations thereof to the outer packaging. The instruction tag or sticker, printed instructions, or combinations thereof may include indicia regarding use of the storm-proofing or water-proofing kit, or other advertisement material such as the manufacturer or individual name and/or likeness (i.e., image) representing the manufacturer such as a spokesperson or executive. Alternatively, the outer packaging itself may include instructions, or indicia regarding use of the storm-proofing or water-proofing kit, or other advertisement material such as the manufacturer or individual name and/or likeness (i.e., image) representing the manufacturer such as a spokesperson or executive. At step 1322 the packaged assembly is shipped to a distributor or sales representative.

Figure 14:
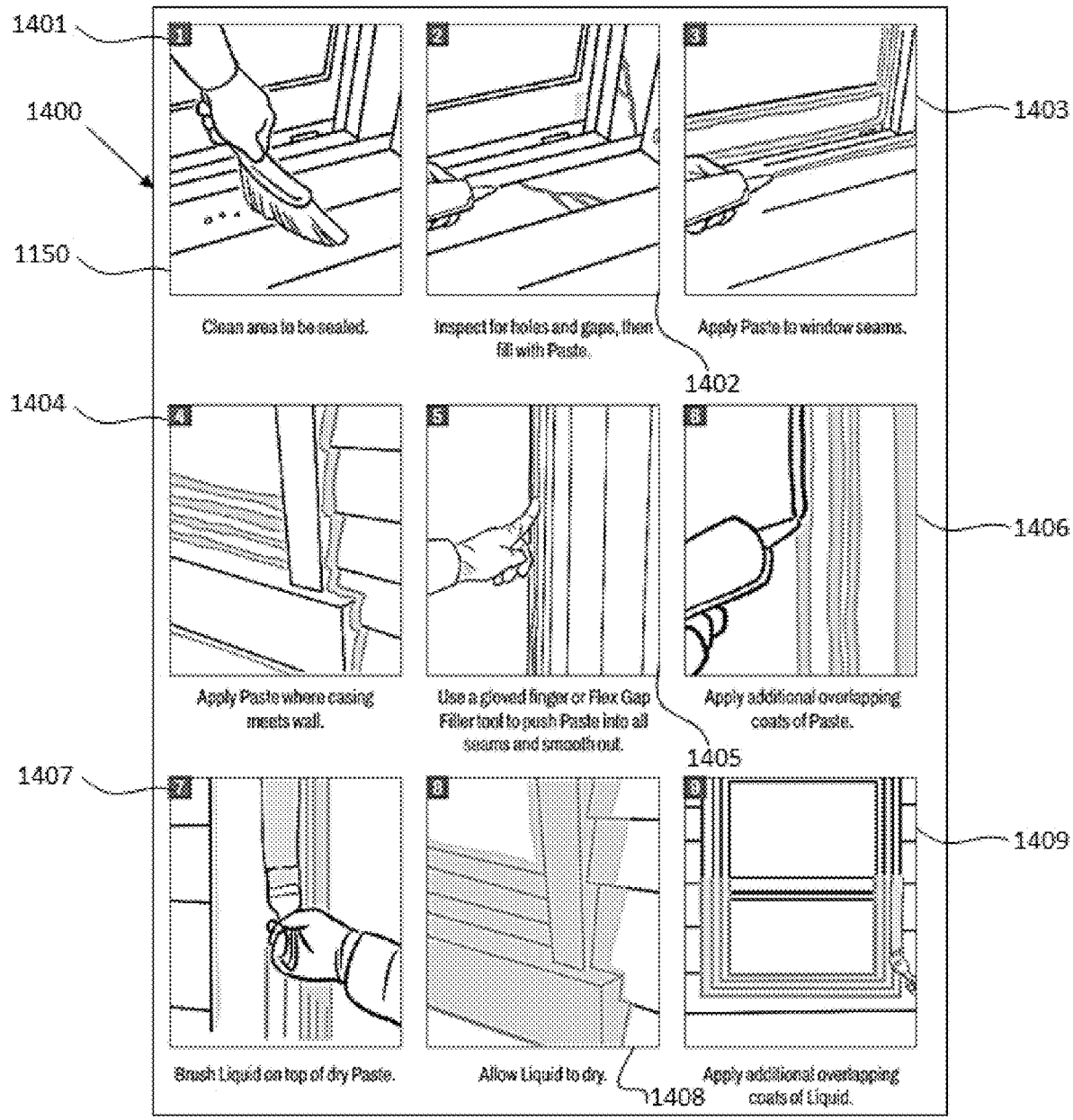
FIGS. 14-24 illustrate exemplary printed instructions in accordance with embodiments of the invention.
Figure 15:
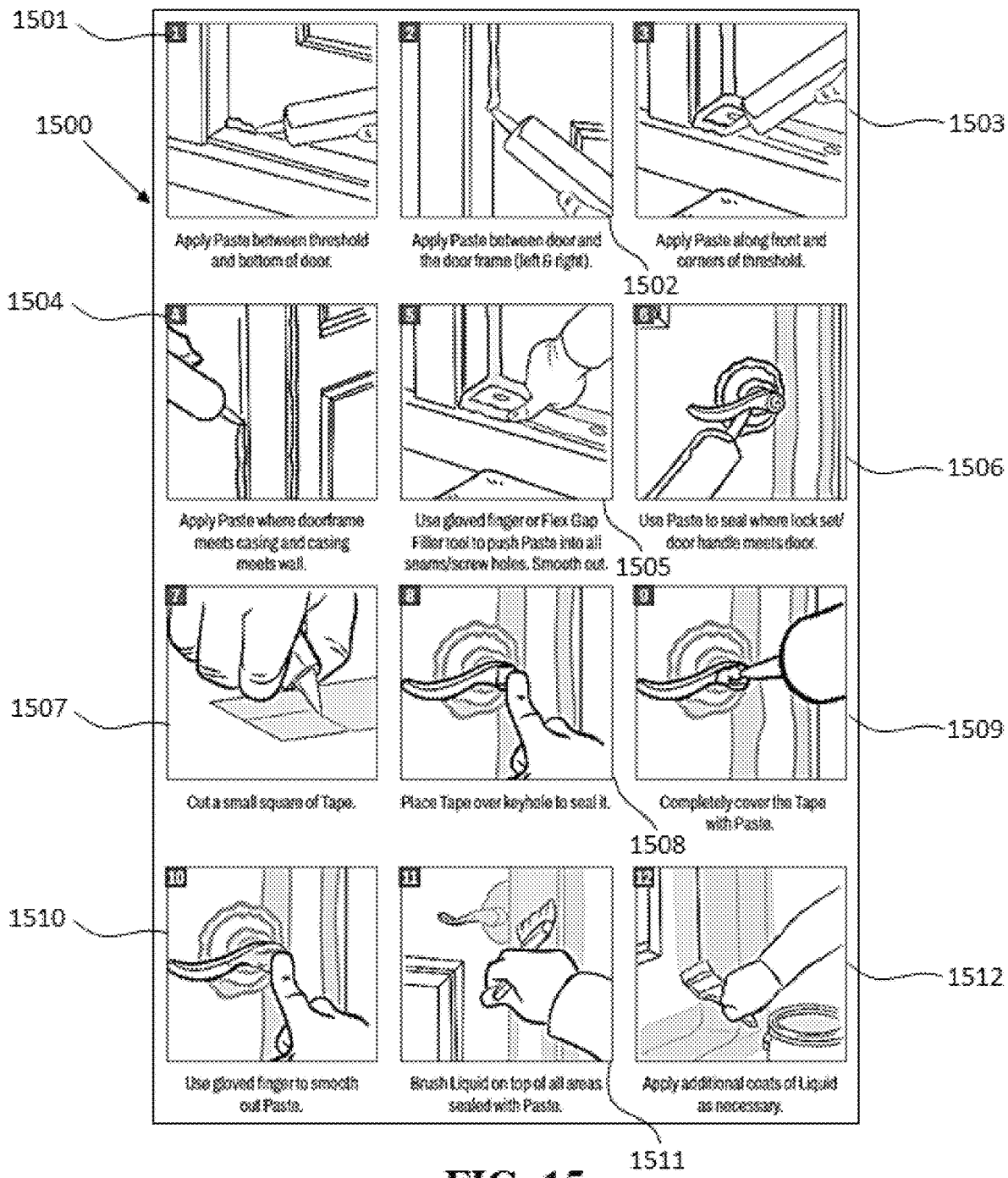

Turning now to FIGS. 14-24, illustrated therein are various embodiments of the printed instructions 1101 and/or 1201 in accordance with embodiments of the invention. The instructions described herein may include directions for the methods of using the compositions and products as described above and as described herein. Instructions 1101 and/or 1201 can be configured as an instruction manual suitable for inclusion with a kit or assembly as described above. In some examples, the printed instructions 1101 and 1201 may further include a quick response (QR) code providing an internet link to additional or original instructions, and/or instructional videos related to the specific instructions 1101 and 1201. FIG. 14 illustrates a view of a first page of instructions pursuant to the methods described above and in accordance with FIG. 3, while FIG. 15 illustrates a view of a second page instructions pursuant to the methods described above and in accordance with FIGS. 3-5, FIG. 16 illustrates a view of a third page of instructions pursuant to the methods described above and in accordance with FIGS. 3, 6, and 8, FIG. 17 illustrates a view of a fourth page of instructions pursuant to the methods described above and in accordance with FIGS. 1-5, 7, and 9, FIG. 18 illustrates a view of a fifth page of instructions pursuant to the methods described above and in accordance with FIGS. 1, 2, and 4-9, FIG. 18 illustrates a view of a sixth page of instructions pursuant to the methods described above and in accordance with FIGS. 1, 2, and 4-6, FIG. 19 illustrates a view of a seventh page of instructions pursuant to the methods described above and in accordance with FIGS. 3, 5, and 8, and 4-9, FIG. 20 illustrates a view of an eighth page of instructions pursuant to the methods described above and in accordance with FIGS. 2, 6, and 8, FIG. 21 illustrates a view of a ninth page of instructions pursuant to the methods described above and in accordance with FIGS. 1-3, FIG. 22 illustrates a view of a tenth page of instructions pursuant to the methods described above and in accordance with FIGS. 1 and 3, FIG. 23 illustrates a view of a eleventh page of instructions pursuant to the methods described above and in accordance with FIGS. 1 and 3, and FIG. 24 illustrates a view of a twelfth page of instructions pursuant to the methods described above related to the removal of the products and compositions. In one embodiment, the printed instructions 1101 are configured as a two-portion instruction manual having a first set of instructions and an additional set of instructions 1201. In the illustrative embodiment of FIGS. 14-24, the printed instructions are configured as a plurality of pages or panels 1400, 1500, 1600, 1700, 1800, 1900, 2000, 2100, 2200, 2300, and 2400. In one example, the printed instructions 1101 and 1201 may be configured as an instruction manual that is formed with an accordion-style fold, with each of the panels 1400, 1500, 1600, 1700, 1800, 1900, 2000, 2100, 2200, 2300, or 2400 forming a page of the instruction manual. One of skill would recognize that the instructions may include directions regarding methods of using the compositions disclosed herein in any manner as previously disclosed above.

Turning now to FIG. 14, illustrated therein is instruction panel 1400 that may include instructions for using a storm or waterproofing kit in accordance with embodiments of the invention described herein. The instructions may include text, pictures, illustrations, or combinations thereof.

In one embodiment, the instructions for preparing a clean work area include step 1401, which may include instructions to optionally put on gloves, and to ensure the area for sealing is clean, dry, and free of grease, oil, and dirt. The instructions may include directions to inspect the objects for sealing such as windows, windowsills, frames, window casings, etc. Step 1402 may include instructions to inspect objects for sealing for holes and gaps, and then filling with the rubber caulk or rubber paste. At step 1403, the instructions may direct the application of the injectable rubber caulk or the malleable rubber paste using the caulking gun and/or the gap filling tool to fill window seams, or any cracks, gaps, holes, etc., on the object or structure to be sealed. Step 1404 may instruct the application of injectable rubber caulk or the malleable rubber paste around the perimeter of joints in which the window casing meets a wall or siding. At step 1405, a gloved finger or the gap filler tool may used to push the rubber caulk or the malleable rubber paste into seams and smoothed out to form an efficient seal. A first coating of the injectable rubber caulk or the malleable rubber paste may be allowed to dry to the touch within about 2-6 hours. After a first coating is allowed to dry, at step 1406 an additional and overlapping coating of rubber caulk or malleable rubber paste may be applied on top of the dried layer.

Step 1407 may instruct application of the liquid rubber composition on top of, or to cover, the dry rubber caulk or rubber paste using a paintbrush. At step 1408, the liquid rubber composition may be allowed to dry about 3-6 hours. At step 1409, additional overlapping layers of liquid rubber composition may be applied to the structure or object.

Turning now to FIG. 15, illustrated therein is instruction panel 1500 that may include instructions for using a storm or waterproofing kit in accordance with embodiments of the invention described herein. For example, panel 1500 may include instructions for sealing a door or other similar object or structure. At step 1501, the rubber caulk or malleable rubber paste may be applied into the gap between the threshold and the bottom of a door. At step 1502, the rubber caulk or malleable rubber paste may be applied between the door and the door frame on each side of the door to seal all sides. At step 1503, the rubber caulk or rubber paste may be applied along the bottom of the entire threshold (including screw holes) to seal the front sides and the corners. The rubber caulk or rubber paste may be pushed into the sides and corners, and smoothed out with gloved finger or the gap filler tool. At step, 1504, a precise bead of the rubber caulk or rubber paste may be applied along the joint in which the doorframe meets the casing, as well as where the casing meets the exterior wall. At step 1505, a gloved finger or the gap filler tool may be used to push the rubber caulk or rubber paste into all seams and smoothed out. At step 1506, the rubber caulk or rubber paste may be used to seal the lock set and/or door handle and the location where the door handle is positioned on the door.

At step 1507, a small portion or square of the rubberized adhesive tape may be cut from the roll of tape, and subsequently applied over the keyhole at step 1508. At step 1509, the tape may be covered with the rubber caulk or rubber paste. At step 1510, the rubber caulk or rubber paste may be smoothed out with a gloved finger and spread over the rubberized adhesive tape edges. The rubber caulk or rubber paste may be allowed to dry about 2-6 hours (or to the touch). Additional layers of rubber caulk or rubber paste may be applied using the same steps as described above. Each additional layer or coating may be applied wider and overlapping of the previous layers of rubber caulk or rubber paste.

At step 1511, a paintbrush may be used to apply the liquid rubber composition on top of or over the dried layers of rubber caulk or rubber paste to seal any gaps, pinholes, or other openings that may not be visible. At step 1512, after the liquid rubber composition is allowed to dry about 3-6 hours, additional coatings of the liquid rubber composition may be applied as necessary.

Figure 16:
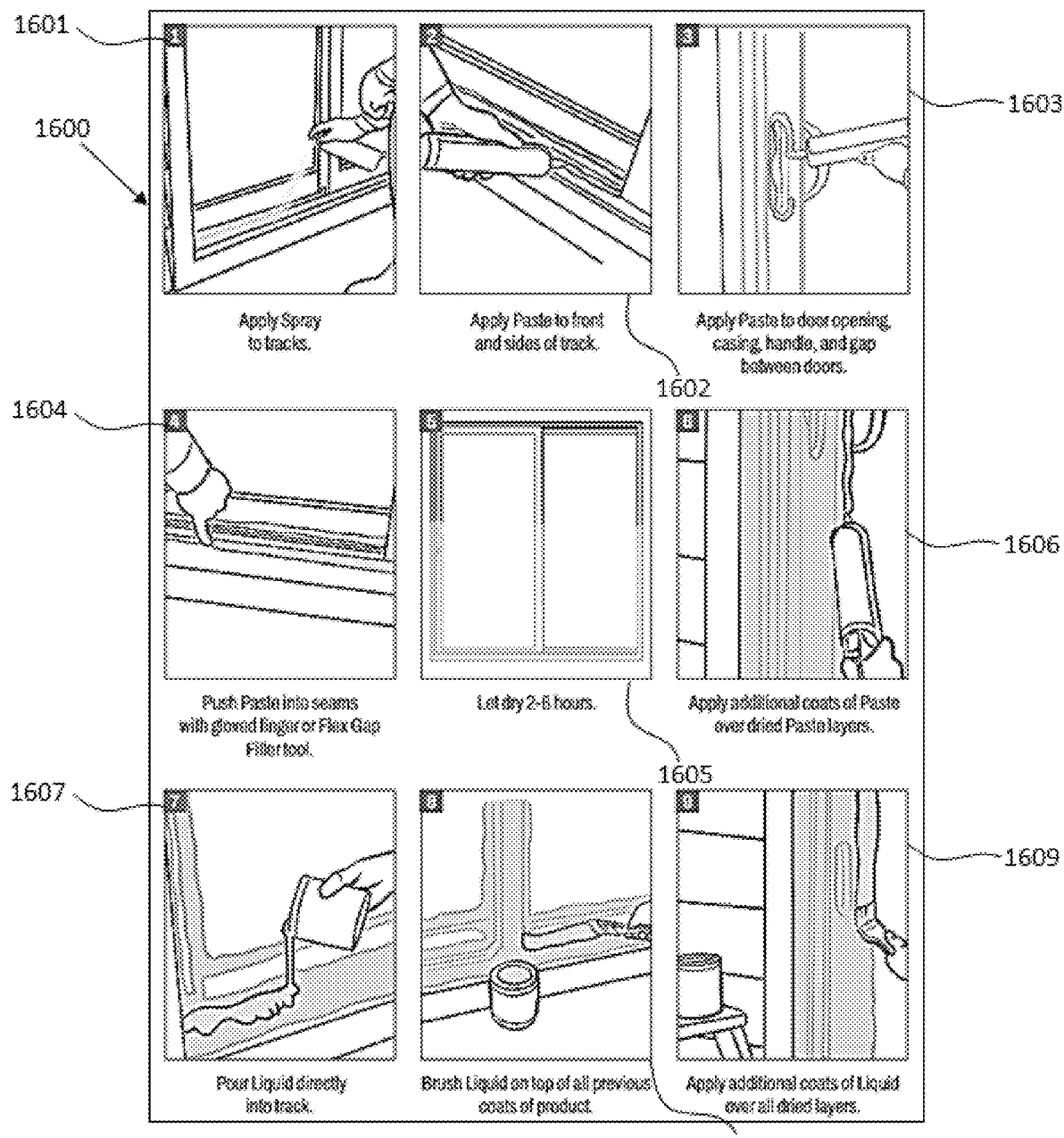

Turning now to FIG. 16, illustrated therein is instruction panel 1600 that may include instructions for using a storm or waterproofing kit in accordance with embodiments of the invention described herein. For example, panel 1600 may include instructions for sealing a sliding door or other similar object or structure. At step 1601, the areas to be sealed may prepared so the areas are clean, dry, and free of grease, oil, and dirt. The can of sprayable aerosol-based rubberized liquid may be shaken well (about 30 seconds) and then sprayed in several light coatings on the door track. Each coating may be allowed to dry for about 30-60 minutes before applying another coating.

At step 1602, the rubber caulk or rubber paste may be applied between the track and the bottom of the doors, to include the front and sides of the track and any weep holes.

At step 1603, the rubber caulk or rubber paste may be applied to where the door meets the frame (opening), where the frame meets the casing, where the casing meets the external wall, and where the doors meet and slide past each other. At step 1604, a gloved finger or the gap filler tool may be used to push rubber caulk or rubber paste into any seams and to smooth out the caulk and paste. At step 1605, the rubber caulk or rubber paste may be allowed to dry for about 2-6 hours. At step 1606, additional coatings of rubber caulk or rubber paste may be applied in accordance with the above steps, ensuring that each applied coating is wider than and overlapping the previous coating.

At step 1607, a light, even coat of the liquid rubber composition may be poured directly into the sliding glass door track to seep into and fill hard-to-reach areas, as well as nonvisible areas. At step 1608, after the liquid rubber composition has dried in about 3-6 hours, a paintbrush may be used to apply a layer of the liquid composition over the previously applied layers of the rubber caulk or rubber paste. At step 1609, when the liquid composition has dried about 3-6 hours, or is dry to the touch, additional coatings of the liquid rubber composition may be applied as necessary to help ensure all voids are sealed, with each individual coating overlapping and wider than the previous coating/layer.

Figure 17:
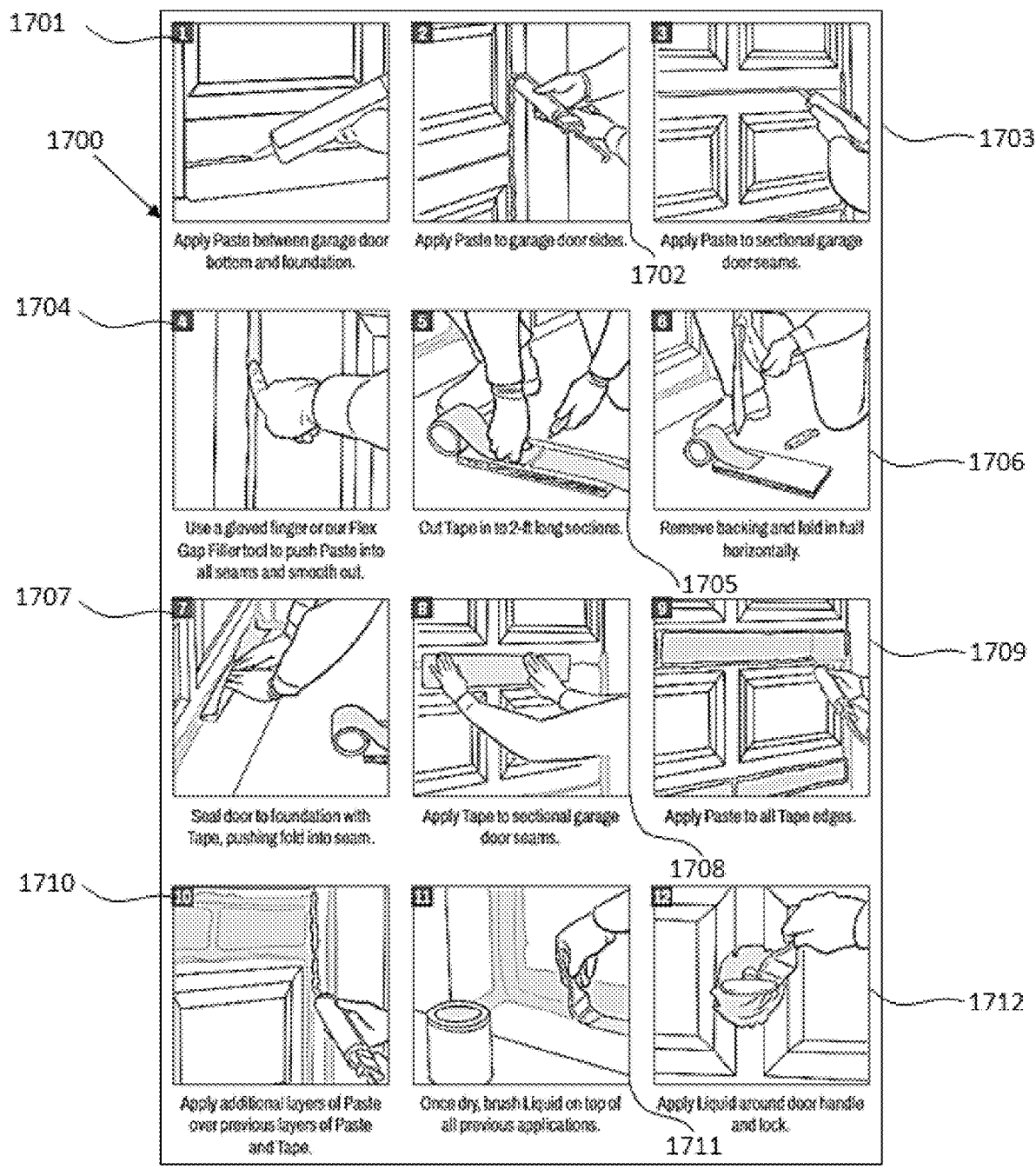

Turning now to FIG. 17, illustrated therein is instruction panel 1700 that may include instructions for using a storm or waterproofing kit in accordance with embodiments of the invention described herein. For example, panel 1700 may include instructions for sealing a garage door or other similar object or structure. The area to be sealed should be clean, dry, and free of grease, oil, and dirt. Vehicles intended for use should be removed and the garage door should be closed and locked. If the garage door can be lifted enough to create a gap between the door and the ground, a cut sheet of plywood should be used that can slip into and fill the gap across the entire width of the garage door. The plywood should also be flush with the front of the garage door. The garage door may be opened and the plywood may be attached to the ground using rubber caulk or rubber paste. The garage door may be reclosed and locked. A gloved finger or the gap filler tool may be used to smooth out any rubber caulk or rubber paste that was pushed out from under the plywood. At step 1701, the rubber caulk or rubber paste may be applied along the bottom of the door where it meets the foundation (or plywood, if used) and applied on both sides of the door at step 1702. At step 1703, the rubber caulk or rubber paste may be applied to the seams of sectional garage doors. At step 1704, the rubber caulk or rubber paste may be pushed into all gaps and seams and smoothed using a gloved finger or the gap filler tool.

At step 1705, the rubberized tape may be unrolled and cut it into 1-ft, 2-ft, or 3-ft long sections. At step 1706, the rubberized tape backing may be removed and the tape may be folded horizontally. At step 1707, the bottom half of the tape may be applied to the ground in front of the garage door. The tape fold, starting from the center, may be pushed into the seam between the ground and the garage door, smoothing out the tape as it is applied. The top half of tape may then be pushed against the door, starting at the center and smoothing it out. Step 1707 may be repeated until the full width of the bottom of the door is sealed. Each end of the tape sections should overlap about 2-3 inches. At step 1708, tape sections may be applied to the seams of sectional garage doors in the same manner as step 1707. At step 1709, rubber caulk or rubber paste may be applied to all tape edges and where the tape sections overlap, and allowed to dry for about 2-6 hours.

At step 1710, additional layers of rubber caulk or rubber paste may then be applied to the tape edges. Each individual layer should be wider and overlap the previous layer of rubber caulk or rubber paste and tape until all gaps and voids are sealed. Each layer of rubber caulk or rubber paste may then dry for about 2-6 hours.

At step 1711, a coat of the rubberized liquid composition may be applied by paintbrush directly on top of the rubber caulk or rubber paste, as well as around the garage door handle and lock at step 1712. After the first coat is allowed to dry about 3-6 hours, additional overlapping coats of the rubberized liquid composition may be applied to create a durable seal.

Figure 18:
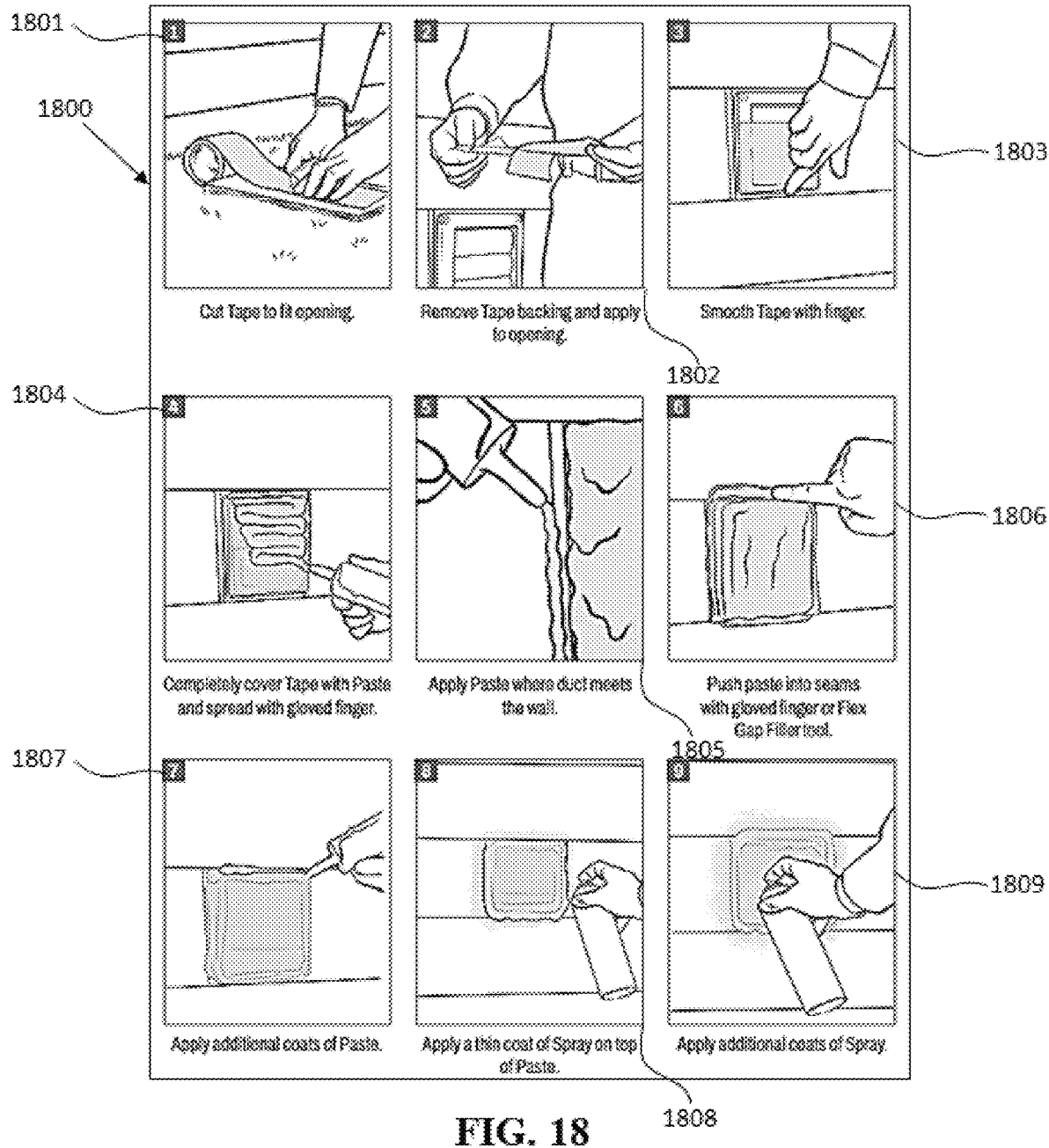

Turning now to FIG. 18, illustrated therein is instruction panel 1800 that may include instructions for using a storm or waterproofing kit in accordance with embodiments of the invention described herein. For example, panel 1800 may include instructions for sealing ducts and vents, or other similar objects or structures. At step 1801, the rubberized adhesive tape may be unrolled and cut to fit the opening of the object to be sealed. At step 1802, the backing is removed from the tape and the tape is applied over the opening of the object for sealing. At step 1803, the tape is smoothed with the fingers to remove air pockets, folds, creases, and wrinkles. At step 1804, the tape may be completely covered with the rubber caulk or rubber paste. A gloved finger may be used to spread the caulk or paste over the entire piece of tape. At step 1805, the rubber caulk or rubber paste may be applied around the perimeter where the duct or vent is positioned in a wall. At step 1806, the rubber caulk or rubber paste may be pushed into the seams using a gloved finger or the gap filler tool. The rubber caulk or rubber paste may be allowed to dry for about 2-6 hours. After drying, at step 1807, additional layers of the rubber caulk or rubber paste may be applied.

At step 1808, the can of sprayable aerosol-based rubberized liquid may be used to spray a thin coating of the rubberized liquid on top of the dried layers of rubber caulk or paste and allowed to dry for about 30-60 minutes. At step 1809, additional layers of the aerosol-based rubberized liquid may be sprayed on top of the paste to create a durable seal.

Figure 19:
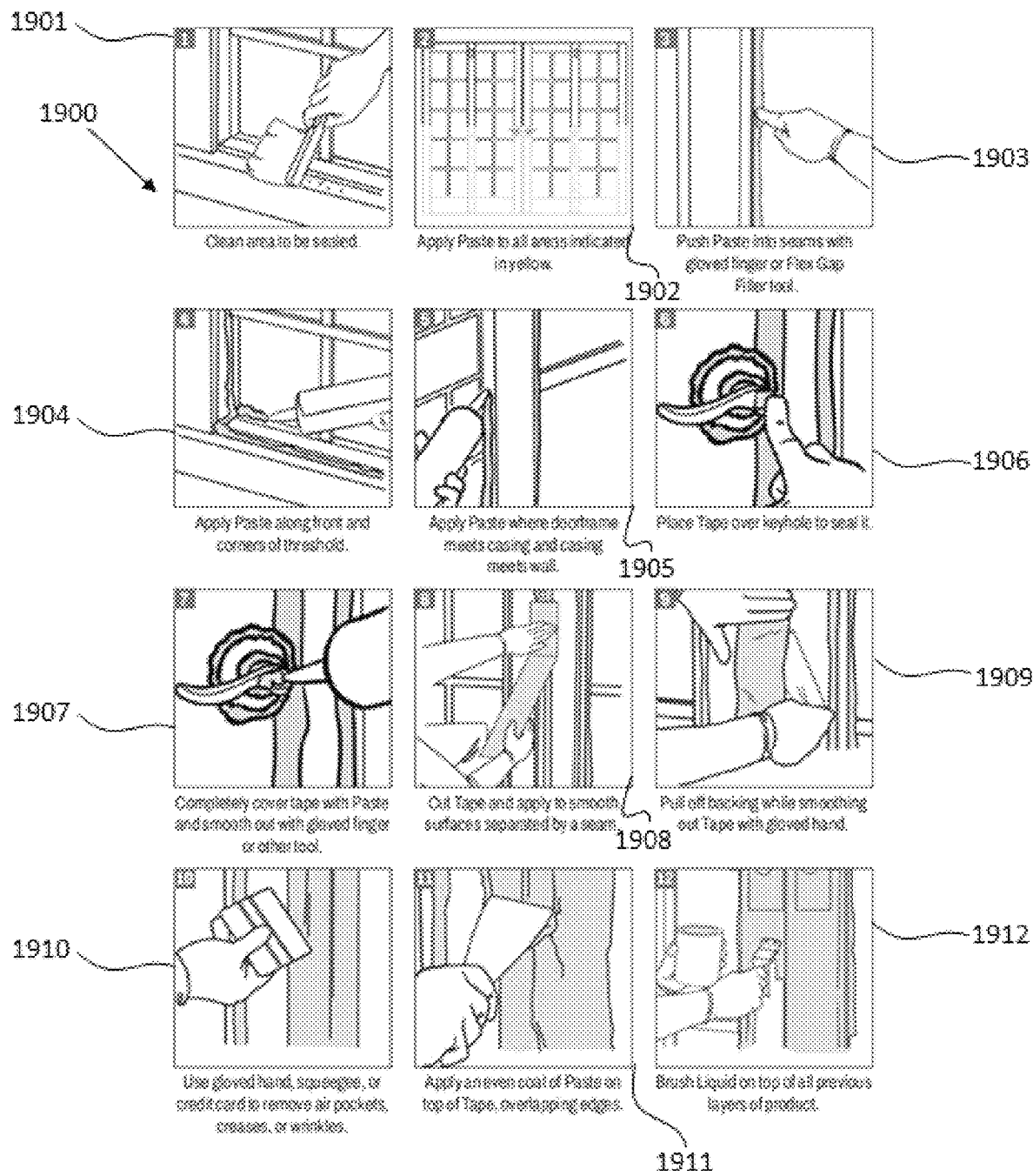

Turning now to FIG. 19, illustrated therein is instruction panel 1900 that may include instructions for using a stormproofing or waterproofing kit in accordance with embodiments of the invention described herein. For example, panel 1900 may include instructions for sealing french doors, double doors, or other similar object or structure. At step 1901, the area to be sealed should be clean, dry, and free of grease, oil, and dirt. At step 1902, the rubber caulk or rubber paste may be applied directly to the door gap, threshold, and bottom of the doors, around lock sets or door handles and seams. At step 1903, a gloved finger may be used to push the rubber caulk or rubber paste into the seams and smoothed out. At step 1904, the rubber caulk or rubber paste may be applied to the front, bottom, sides, and corners of the threshold including screw holes, and smoothed out with a gloved finger of the gap filler tool. At step 1905, the rubber caulk or rubber paste may be applied to where the doorframe meets the casing a well as where the casing meets the exterior wall. The paste or caulk may be smoothed out with a gloved finger or gap filler tool. At steps 1906 and 1907, a small portion or square of the rubberized adhesive tape may be cut from the roll of tape, and subsequently applied over the keyhole and the tape may be covered with the rubber caulk or rubber paste. The rubber caulk or rubber paste may be allowed to dry about 2-6 hours (or to the touch). Additional layers of rubber caulk or rubber paste may be applied using the same steps as described above. Each additional layer or coating may be applied wider and overlapping of the previous layers of rubber caulk or rubber paste. At step 1908, strips of tape may be applied to smooth surfaces separated by seams and over the paste or caulk. At step 1909, the backing from the tape may be removed while smoothing out the tape with a gloved hand during application. At step 1910, the tape may be smoothed out using a gloved hand, squeegee, or credit card to remove air pockets or wrinkles. At step 1911, the rubber caulk or rubber paste may be applied using a putty knife or other tool over the tape and overlapping the tape edges. At step 1912, the rubberized liquid may be applied with a paintbrush to cover the previous layers of rubberized product.

Figure 20:
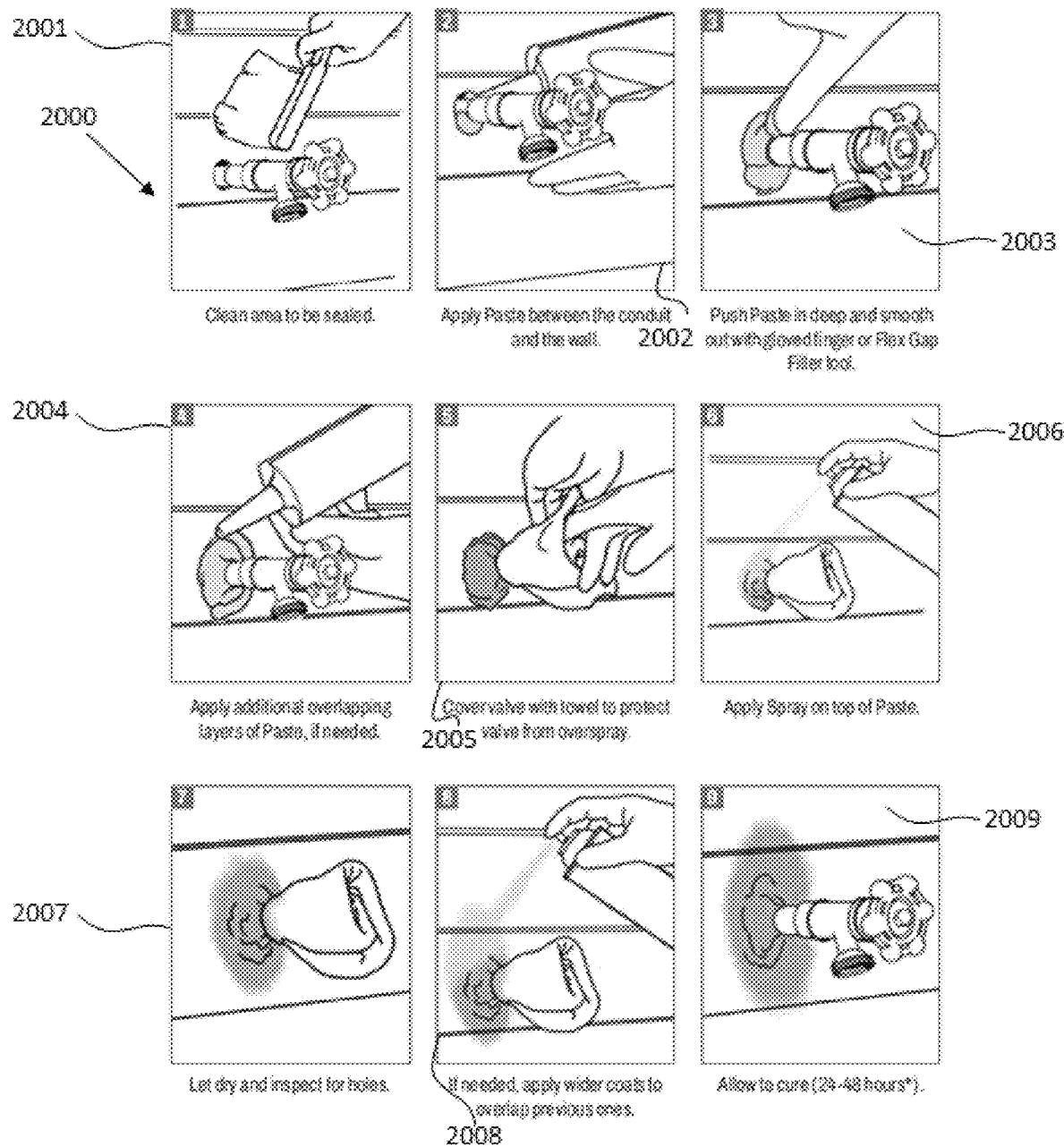

Turning now to FIG. 20, illustrated therein is instruction panel 2000 that may include instructions for sealing conduits or other similar objects or structures. At step 2001, the area to be sealed should be clean, dry, and free of grease, oil, and dirt. At step 2002, the rubber caulk or rubber paste may be applied directly around the conduit where it meets a wall and filling any voids. At step 2003, a gloved finger or gap filling tool may be used to push the rubber caulk or rubber paste into gaps and voids and smoothed out. At step 2004, the rubber caulk or rubber paste may be allowed to dry about 2-6 hours (or to the touch) and additional layers of rubber caulk or rubber paste may be applied using the same steps as described above. Each additional layer or coating may be applied wider and overlapping of the previous layers of rubber caulk or rubber paste. At step 2005, a rag may be placed over a portion of the conduit to prevent overspray. At step 2006, the aerosolized rubber spray may be applied over the layers of rubber caulk or rubber paste. At step 2007, the rubber spray may be allowed to dry and at step 2008 a wider coat of the rubberized spray may be applied over the dried spray. At step 2009, the spray may be allowed to cure for about 24-48 hours.

Figure 21:
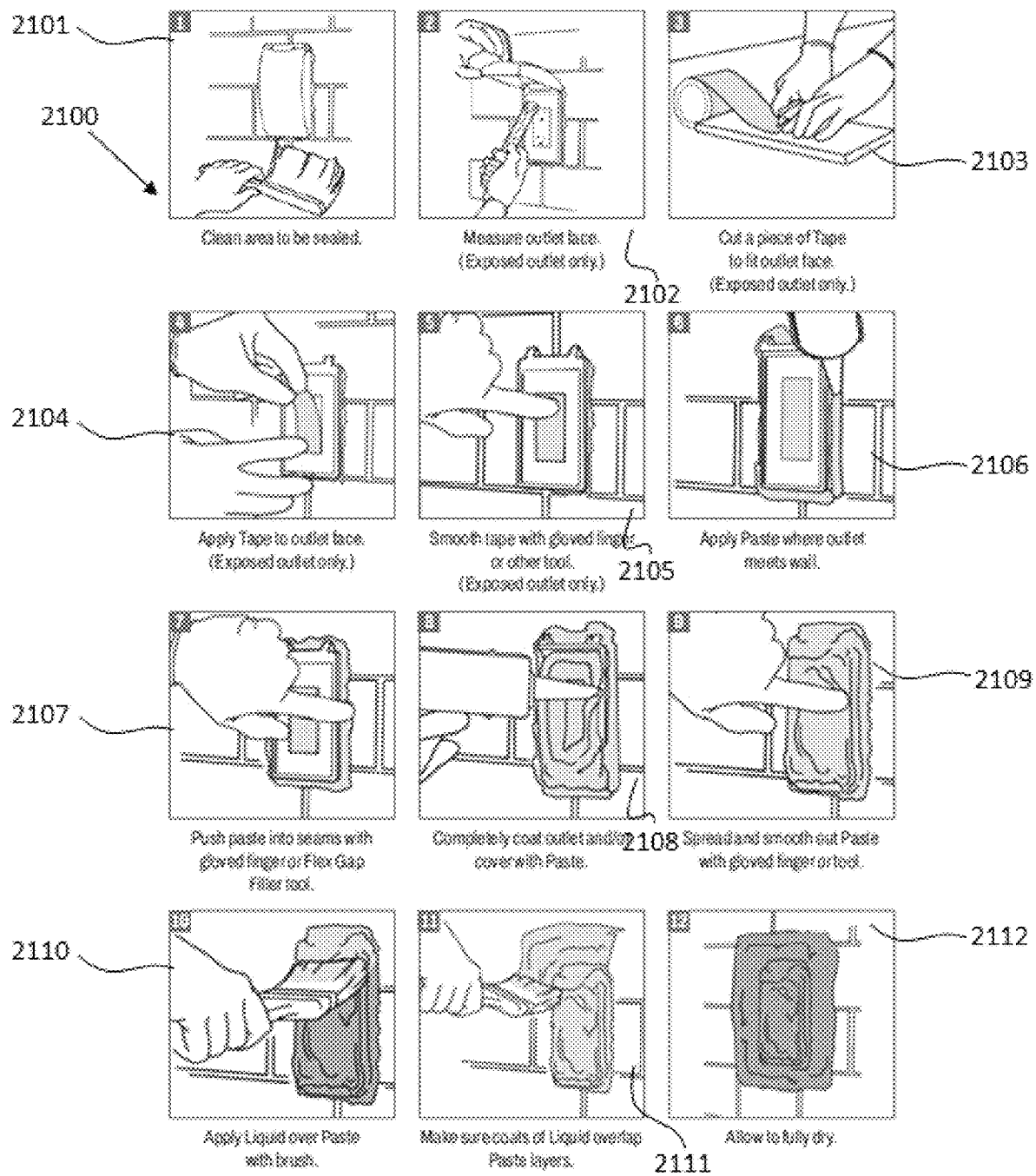

Turning now to FIG. 21, illustrated therein is instruction panel 2100 that may include instructions for using a stormproofing or waterproofing kit in accordance with embodiments of the invention described herein. For example, panel 2100 may include instructions for sealing electrical outlets or other similar objects or structures. At step 2101, the area to be sealed should be clean, dry, and free of grease, oil, and dirt. At step 2102 the areas to be sealed is measured. At step 2103, a piece of rubberized tape is cut to fit the outlet face or area measured. At step 2104, the rubberized tape is applied to the outlet face and at step 2105, the tape may be smoothed out with a gloved finger or other tool. At step 2106, the rubber caulk or rubber paste may be applied to where the outlet meets the wall and at step 2107, the rubber caulk or rubber paste may be pushed into seams and gaps with a gloved finger or gap filler tool. At step 2108, the rubber caulk or rubber paste may be applied to complete coat the entire outlet, tape, and layer of paste or caulk. At step 2109, a gloved finger or the gap filler tool may be used to smooth out the paste or caulk and allowed to dry about 2-6 hours (or to the touch). At steps 2110 and 2111 the rubberized liquid may be applied with a paintbrush to coat and overlap the previous layers of caulk or paste. At step 2112, the rubberized liquid may be allowed to cure for about 24-48 hours.

Figure 22:
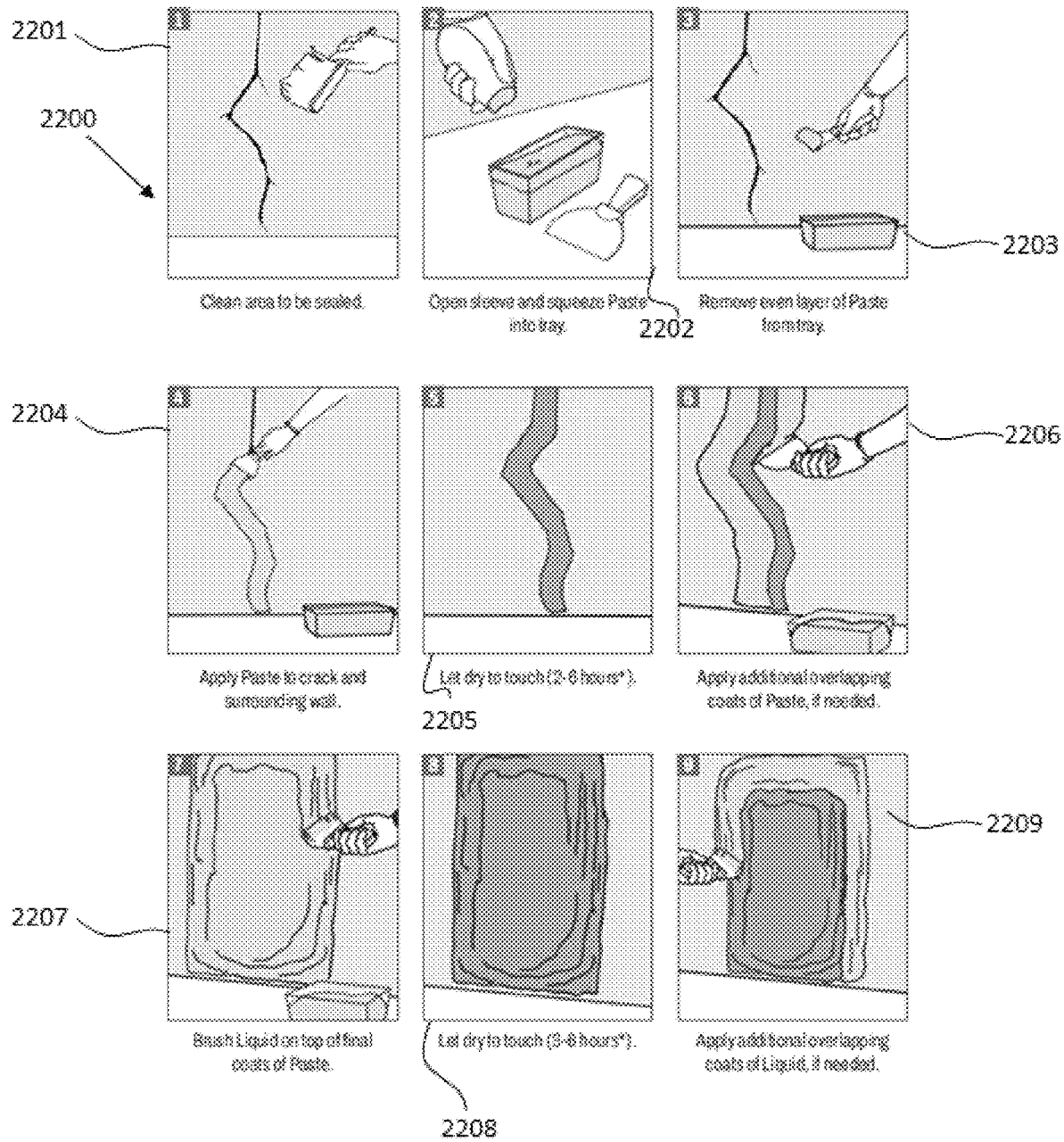

Turning now to FIG. 22, illustrated therein is instruction panel 2200 that may include instructions for using a storm or waterproofing kit in accordance with embodiments of the invention described herein. For example, panel 2200 may include instructions for sealing foundation cracks, holes, other similar objects or structures. At step 2201, the area to be sealed should be clean, dry, and free of grease, oil, and dirt. At step 2202 the rubber caulk or paste may be inserted into a tray and at steps 2203 ad 2204, using a putty knife or other tool, the rubber caulk or paste may be inserted directly into the foundation crack or opening as well as the surrounding areas. At step 2205, the rubber caulk or paste may be allowed to dry to the touch. At step 2206, additional layers of the rubber caulk or paste may be applied to cover and overlap the previous layers. At step 2207, the rubberized liquid may be applied with a paintbrush to coat and overlap the previous layers of caulk or paste. At step 2208, rubberized liquid may be allowed to dry to the touch for about 3-6 hours. At step 2209 additional layers of the rubberized liquid may be applied.

Figure 23:
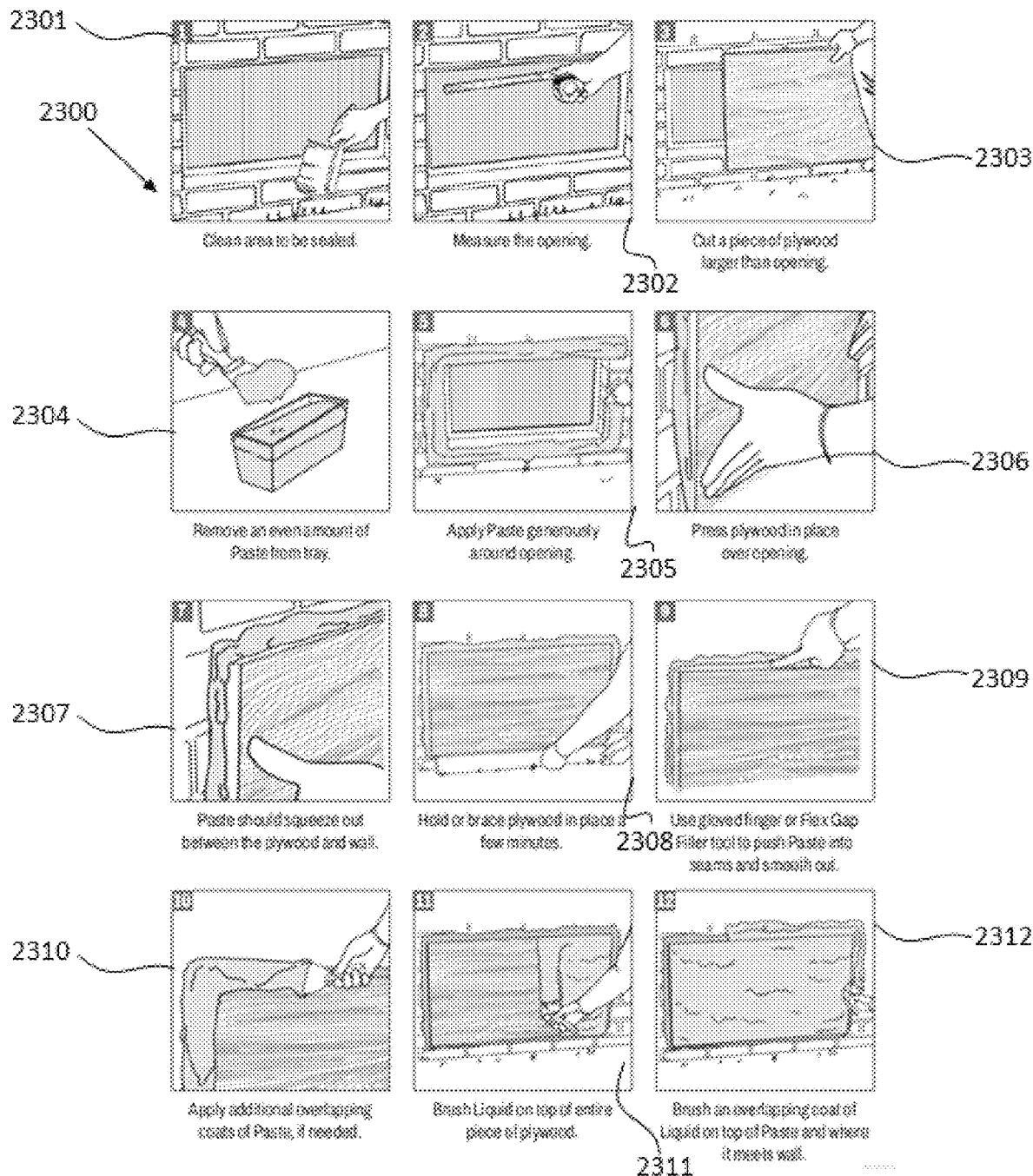

Turning now to FIG. 23, illustrated therein is instruction panel 2300 that may include instructions for using a storm or waterproofing kit in accordance with embodiments of the invention described herein. For example, panel 2300 may include instructions for sealing crawl spaces, windows, pet doors, other similar objects or structures. At step 2301, the area to be sealed should be clean, dry, and free of grease, oil, and dirt. At step 2302 area to be sealed is measured. At step 2303, a piece of plywood is cut to cover the area to be sealed. At step 2304, the rubber caulk or paste may be inserted into a tray and at step 2305 the rubber caulk or paste may be applied around the perimeter of the area to be sealed. At step, 2306, the plywood is placed over the opening and at step 2307, the paste is squeezed from the plywood and the wall. At step 2308, the plywood is held in place for a few minutes and at step 2309, using a gloved finger or gap filler tool, the paste or caulk is smoothed out after being pushed into the seams and cracks. At step 2310, additional layers of the rubber caulk or paste may be applied to cover and overlap the previous layers. At step 2311, At step 2312, an additional layer of the rubberized liquid may be applied with a paintbrush to coat the prior layers of paste and liquid.

Figure 24:
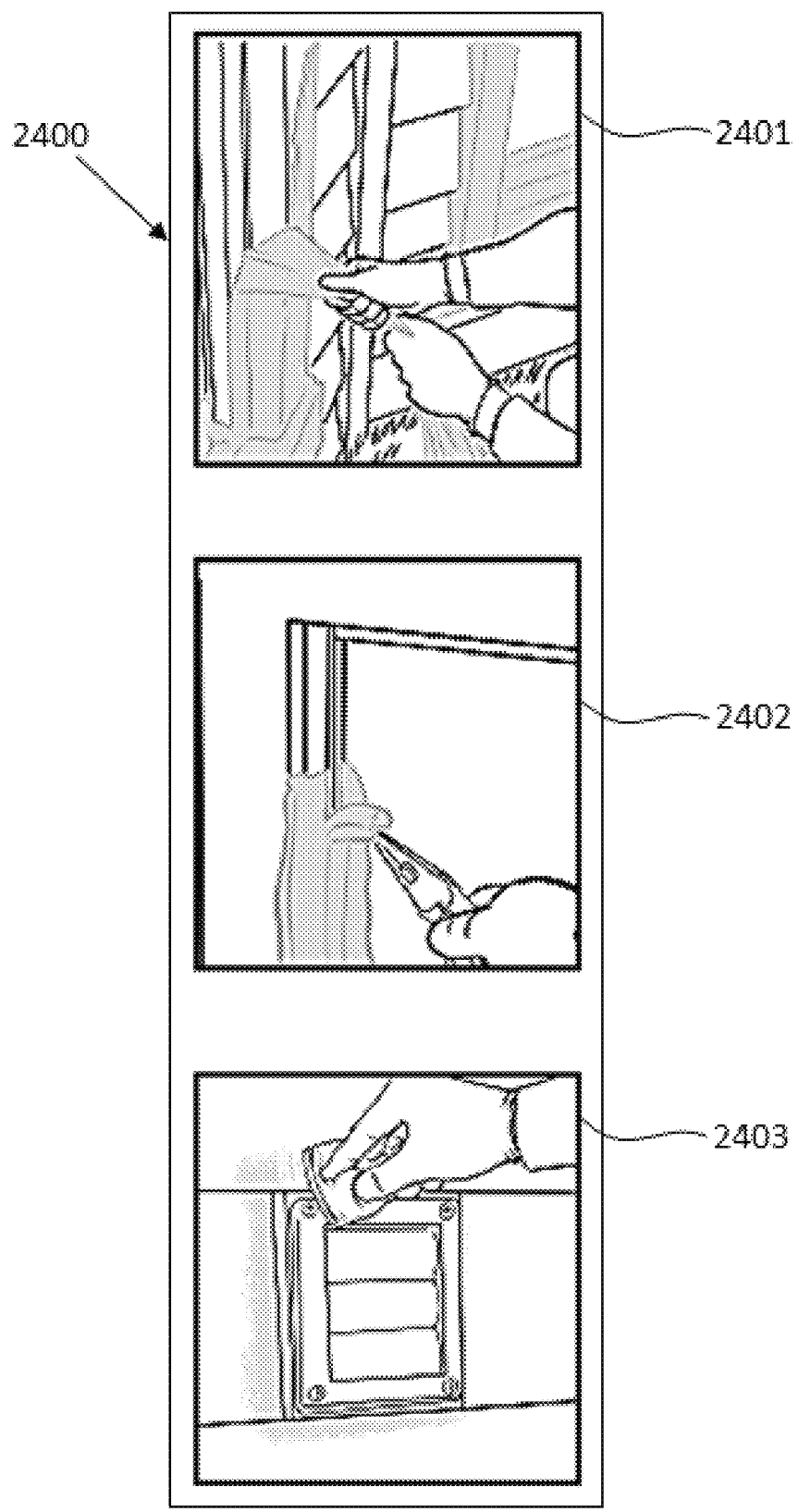

Turning now to FIG. 24, illustrated therein is instruction panel 2400. Panel 2400 may include instructions for removing the rubberized products from a storm or waterproofing kit in accordance with embodiments of the invention described herein. For example, at step 2401, a corner of a portion of the dried removable rubberized composition or tape may be pulled away from the sealed surface using your hands. In the event the entire section is not removed in one piece, the process may be restarted from another section. Remaining residue may be cleaned using a stiff nylon brush, or a paper towel or rag with denatured alcohol. At step 2402, the rubberized compositions or tape located in hard to reach areas or positions may be removed by grasping a corner of the product with needle-nose pliers or similar tool, and pulling the material until the material may be grasped by hand and the remainder of the material removed. At step 2403, the dried aerosolized-rubberized liquid spray may be removed by starting with a corner of the material and using your thumb or a cloth to peel the product until there is enough to grasp with your hands. Using your hands, keep pulling the product until it is completely removed. Depending on the thickness of the application, the material may come off in pieces. Additional patches of overspray material may be removed by using denatured alcohol on a cloth applied and rubbed directly to the area that required removal.

The foregoing description should be considered illustrative rather than limiting. It should be recognized that various modifications can be made without departing from the spirit or scope of the invention as described and claimed herein.

What is claimed is:

1. A kit for use in storm-proofing a structure comprising:
a cartridge comprising one of a) an injectable caulk and b) a malleable paste;
a container comprising a viscous liquid composition,
   wherein the injectable caulk, the malleable paste, and the viscous liquid composition are removable after drying by using only an individual's hands and pulling the injectable caulk, the malleable paste, and the viscous liquid composition away from the structure without damaging the structure;
a caulking gun configured to dispense contents of the cartridge;
a pair of gloves;
a paintbrush;
a gap filler tool; and
printed instructions,
   wherein each component is combined into a unitary packaging assembly.

2. The kit of claim 1, the printed instructions instructing to fill gaps in the structure with the injectable caulk or the malleable paste using the caulking gun or the gap filler tool.

3. The kit of claim 2, the printed instructions further instructing coating the caulk filled gaps or coating the paste filled gaps with the viscous liquid composition using the paintbrush.

4. The kit of claim 1, the printed instructions instructing to cover a portion of the structure with the viscous liquid composition using the paintbrush.

5. The kit of claim 1, further comprising:
a roll comprising an adhesive tape;
a can comprising a sprayable aerosol-based liquid,
   wherein the adhesive tape and the sprayable aerosol-based liquid are removable without damaging the structure;
a pair of safety goggles; and
additional printed instructions.

6. The kit of claim 5, the additional printed instructions instructing spraying the sprayable aerosol-based liquid on at least a portion the structure.

7. The kit of claim 5, the additional printed instructions instructing placement of the adhesive tape on at least a portion of the structure.

8. The kit of claim 5, the additional printed instructions instructing to fill or cover a portion of the structure with the injectable caulk or the malleable paste using the caulking gun or the gap filler tool.

9. The kit of claim 8, the additional printed instructions further instructing coating the caulk filled or covered portion of the structure or coating the paste filled or covered portion of the structure with the viscous liquid composition using the paintbrush.

10. The kit of claim 7, the additional printed instructions instructing to cover a portion of the structure with the viscous liquid composition using the paintbrush.

11. The kit of claim 1, wherein the injectable caulk, the malleable paste, and the viscous liquid composition are rubberized.

12. A kit for use in storm-proofing a structure comprising:
a cartridge comprising one of a) an injectable caulk and b) a malleable paste;
a container comprising a viscous liquid composition;
a roll comprising an adhesive tape;
a can comprising a sprayable aerosol-based liquid,
   wherein the injectable caulk, the malleable paste, the viscous liquid composition, the adhesive tape, and the sprayable aerosol-based liquid are removable after drying by using only an individual's hands and pulling the injectable caulk, the malleable paste, and the viscous liquid composition away from the structure without damaging the structure adhered to;
a caulking gun configured to engage and dispense contents of the cartridge;
a paintbrush;
a gap filler tool;
a pair of gloves;
a pair of safety goggles; and
printed instructions,
   wherein each component is combined into a unitary packaging assembly.

13. The kit of claim 12, the printed instructions instructing to fill a portion of the structure with the injectable caulk or the malleable paste using the caulking gun or the gap filler tool.

14. The kit of claim 13, the printed instructions further instructing coating the caulk filled portion of the structure or the malleable paste filled portion of the structure with the viscous liquid composition using the paintbrush.

15. The kit of claim 12, the printed instructions instructing covering a portion of the structure with the injectable caulk or the malleable paste using the caulking gun or the gap filler tool, or covering the portion of the structure with the viscous liquid composition using the paintbrush, or covering the portion of the structure with the adhesive tape, or spraying the portion of the structure with the sprayable aerosol-based liquid.

16. The kit of claim 15, the printed instructions further instructing removal of the injectable caulk, the malleable paste, the viscous liquid composition, the adhesive tape, and the sprayable aerosol-based liquid after a storm.

17. The kit of claim 12, wherein the injectable caulk, the malleable paste, the viscous liquid composition, the adhesive tape, and the sprayable aerosol-based liquid are rubberized.

18. A waterproofing kit comprising:
a cartridge comprising one of a) an injectable caulk and b) a malleable paste;
a container comprising a viscous liquid composition,
   wherein the injectable caulk, the malleable paste, and the viscous liquid composition are removable after drying by using only an individual's hands and pulling the injectable caulk, the malleable paste, and the viscous liquid composition away from a structure without damaging a structure or an object adhered to;
a caulking gun configured to dispense contents of the cartridge;
a pair of gloves;
a gap filler tool;
a paintbrush; and
printed instructions,
   wherein each component is combined into a unitary packaging assembly.

19. The kit of claim 18, the printed instructions instructing applying the injectable caulk or the malleable paste with the caulking gun or the gap filler tool to fill gaps of an object, and the printed instructions further instructing applying the viscous liquid composition with the paintbrush to cover the caulk filled gaps or the paste filled gaps.

20. The kit of claim 18, further comprising:
a roll comprising an adhesive tape;
a can comprising a sprayable aerosol-based liquid,
   wherein the adhesive tape and the sprayable aerosol-based liquid are removable without damaging a structure or an object adhered to;

a pair of safety goggles; and additional printed instructions.

21. The kit of claim 20, the additional printed instructions instructing covering at least part of an object with the injectable caulk or the malleable paste using the caulking gun or the gap filler tool, or covering at least part of the object with the viscous liquid composition using the paintbrush, or covering at least part of the object with the adhesive tape, or spraying at least part of the portion of the object with the sprayable aerosol-based liquid.

22. The kit of claim 21, the additional printed instructions further instructing removal of the injectable caulk, the malleable paste, the viscous liquid composition, the adhesive tape, and the sprayable aerosol-based liquid after a storm.

* * * * *